United States Patent
Ebisawa et al.

(10) Patent No.: US 10,277,452 B2
(45) Date of Patent: Apr. 30, 2019

(54) MESSAGE PROCESSING SYSTEM AND MESSAGE PROCESSING METHOD

(75) Inventors: Satoshi Ebisawa, Tokyo (JP); Masayuki Doi, Tokyo (JP)

(73) Assignee: GREE, INC., Tokyo (JP)

(*) Notice: Subject to any disclaimer, the term of this patent is extended or adjusted under 35 U.S.C. 154(b) by 316 days.

(21) Appl. No.: 13/395,430

(22) PCT Filed: Jul. 8, 2011

(86) PCT No.: PCT/JP2011/065722
§ 371 (c)(1),
(2), (4) Date: Mar. 9, 2012

(87) PCT Pub. No.: WO2013/008289
PCT Pub. Date: Jan. 17, 2013

(65) Prior Publication Data
US 2013/0013702 A1    Jan. 10, 2013

(51) Int. Cl.
*G06F 11/07* (2006.01)
*H04L 12/24* (2006.01)
(Continued)

(52) U.S. Cl.
CPC ...... *H04L 41/0604* (2013.01); *G06F 11/0703* (2013.01); *G06F 11/0709* (2013.01);
(Continued)

(58) Field of Classification Search
CPC ............ G06F 11/0709; G06F 11/0703; G06F 11/3495; G06F 11/3476; G06F 11/3006;
(Continued)

(56) References Cited

U.S. PATENT DOCUMENTS 6,907,551 B2 * 6/2005 Katagiri et al. ................ 714/57
7,305,466 B1 * 12/2007 Kaffine ............... H04L 12/2602
                                                    703/21
(Continued)

FOREIGN PATENT DOCUMENTS

JP    2000-324121    11/2000
JP    2006-58960     3/2006
(Continued)

OTHER PUBLICATIONS

Doi, M., "A monitoring system for a large-scale infrastructure Part 2", Jan. 20, 2011, http://labs.gree.jp/blog/2011/01/2390, Gree Engineers Blog, with provided English translation, 23 pgs.*
(Continued)

*Primary Examiner* — Gregory G Todd
(74) *Attorney, Agent, or Firm* — Pillsbury Winthrop Shaw Pittman, LLP

(57) ABSTRACT

A message processing system with improved maintainability, while ensuring availability, is provided. A filtering section 131 determines a degree of importance of an error message transmitted from a monitoring target server 110 and performs a process of filtering. A queue 121 receives the error message after the process of filtering by the filtering section 131 and transmits the error message to all summarizing sections 132. The summarizing section 132 then performs a process of summarizing for summarizing error messages of the same type as to the error messages after the process of filtering by the filtering section 131. A topic 122 receives the error message after the process of summarizing from one summarizing section 132. The topic 122 then selects one mail transmitting section from mail transmitting sections 133 informing by e-mail transmission about the error message after the process of summarizing by the
(Continued)

summarizing section 132, and transmits the error message to the selected mail transmitting section 133.

11 Claims, 15 Drawing Sheets

(51) Int. Cl.
    *G06F 15/16*     (2006.01)
    *H04L 12/26*     (2006.01)
    *H04L 29/08*     (2006.01)
    *H04L 29/14*     (2006.01)

(52) U.S. Cl.
    CPC .......... G06F 11/0784 (2013.01); *G06F 15/16* (2013.01); *H04L 41/0609* (2013.01); *H04L 43/0817* (2013.01); *H04L 67/26* (2013.01); *H04L 69/40* (2013.01)

(58) Field of Classification Search
    CPC ............. G06F 11/3072; G06F 11/3082; G06F 11/0784; G06F 2201/875; G06F 2201/86; G06F 16/90344; H04L 41/06–41/0627; H04L 41/0893; H04L 41/0659; H04L 43/028
    USPC .............................................. 709/206; 714/48
    See application file for complete search history.

(56) References Cited

U.S. PATENT DOCUMENTS

| | | | |
|---|---|---|---|
| 7,428,300 B1* | 9/2008 | Drew | H04M 3/2254 379/14.01 |
| 7,996,894 B1* | 8/2011 | Chen et al. | 726/22 |
| 8,504,688 B2* | 8/2013 | Kullos | 709/224 |
| 8,589,732 B2* | 11/2013 | Krishnaprasad et al. | 714/20 |
| 2002/0198985 A1* | 12/2002 | Fraenkel et al. | 709/224 |
| 2003/0061323 A1* | 3/2003 | East | H04L 41/0213 709/223 |
| 2003/0229674 A1* | 12/2003 | Cabrera et al. | 709/207 |
| 2004/0071090 A1* | 4/2004 | Corson et al. | 370/244 |
| 2004/0167964 A1* | 8/2004 | Rounthwaite et al. | 709/206 |
| 2005/0080763 A1* | 4/2005 | Opatowski | 707/1 |
| 2005/0278708 A1* | 12/2005 | Zhao et al. | 717/136 |
| 2006/0059270 A1* | 3/2006 | Pleasant | H04J 3/0664 709/237 |
| 2008/0189369 A1* | 8/2008 | Chandrasekaran et al. | 709/206 |
| 2009/0190581 A1* | 7/2009 | Chang et al. | 370/389 |
| 2009/0245134 A1* | 10/2009 | Archer et al. | 370/254 |
| 2010/0185984 A1* | 7/2010 | Wright | G06T 11/206 715/833 |
| 2012/0005542 A1* | 1/2012 | Petersen | G06F 11/0709 714/48 |
| 2012/0140083 A1* | 6/2012 | Schultz et al. | 348/207.1 |
| 2012/0233326 A1* | 9/2012 | Shaffer | H04W 4/005 709/225 |
| 2013/0013702 A1* | 1/2013 | Ebisawa et al. | 709/206 |

FOREIGN PATENT DOCUMENTS

| | | |
|---|---|---|
| JP | 2007-52706 | 3/2007 |
| JP | 2007-257396 | 10/2007 |
| JP | 2009-171476 | 7/2009 |
| JP | 2010-220022 | 9/2010 |
| WO | WO-2013/008289 A1 | 1/2013 |

OTHER PUBLICATIONS

"Submission of Certificate of Exception to Loss of Novelty", Gree Engineers Blog, http://labs.gree.jp/blog/2011/01/2390 Downloaded Jan. 20, 2011, 8 pgs.

Office Action issued in Japanese Application No. 2014-042029 dated Apr. 13, 2015.

* cited by examiner

MESSAGE PROCESSING SYSTEM AND MESSAGE PROCESSING METHOD

TECHNICAL FIELD OF THE INVENTION

The present invention relates to a message processing system and a message processing method and, more particularly, to a message processing system and a message processing method for processing messages transmitted from a large number of monitoring target servers.

BACKGROUND OF THE INVENTION

In operating a server, it is necessary for the server to be monitored whether or not the server appropriately operates, and the like. Regarding the server monitoring, a diagnostic program for checking whether a server appropriately operates is installed in the server and an alert is issued when the server does not appropriately operates, thereby appropriately dealing with the server.

The alert is a program message issued from the diagnostic program executed periodically in each server. Examples of the program message include an error message issued when a capacity of a HDD (Hard disk drive) included in the server reaches a certain rate or more, and an error message informing about a malicious connection to the server.

FIG. 15 is a diagram showing a configuration example of a conventional server monitoring system.

As shown in FIG. 15, a center server 210 is connected to each of server groups 110 to be monitored. The center server 210 collects error messages, compares the error messages and various values with an alert rule, and transmits e-mail as alert mail to a person in charge of failure or the like.

The center server 210 determines, based on a predetermined rule, a degree of importance and the like as to an alert received from each of the monitoring target servers 110 and summarizes alerts of the same type. The center server 210 then transmits contents of the alert by e-mail or the like to a predetermined address for informing a person in charge of failure about occurrence of an abnormal event. If the alerts of the same type are not summarized, the person in charge of failure receives a large amount of e-mail, resulting in difficulty of grasping a situation immediately.

A server system is proposed in which a plurality of servers are provided for ensuring availability of a monitoring system, an operation system server and a standby system server are included, and the operation system server is switched to the standby system server in the event of failure (for example, see 1: Japanese Patent Laid-Open No. 2006-058960.

SUMMARY OF THE INVENTION

However, according to the conventional configuration, increasing the number of monitoring target servers causes data congestions whose data is processed by the center server 210. If the center server 210 goes down or the like resulting in failure in processing, a problem arises in which all of the monitoring target servers 110 cannot be monitored.

Also, every time the center server 210 is changed, information with respect to each monitoring target server 110 has to be attached to a new center server 210, and further, settings of each monitoring target server 110 have to be changed. Unfortunately, this leads to a large workload in maintenance.

The present invention has been made in view of the above circumstances. An object of the present invention is to provide a message processing system with excellent maintainability, while ensuring availability.

In order to solve the problems, the present invention provides a message processing system for receiving a message from a publisher server and performing a process depending on the received message including: a message delivering apparatus connected to the publisher server; and two or more message processing apparatuses connected to the message delivering apparatus, wherein the message processing apparatus including a message processing unit for processing a message transmitted from the publisher server and received via the message delivering apparatus; a representative determining unit for determining whether or not the message processing unit provided in its own apparatus is a representative by comparing predetermined information set in its own apparatus with predetermined information set in the other message processing apparatus or the other message processing apparatuses; and an informing unit for sending a notice depending on the message processed by the message processing unit when the representative determining unit determines the message processing unit as a representative, and the message delivering apparatus includes a first broadcast unit for transmitting a message received from the publisher server to all the message processing apparatuses; and a second broadcast unit for transmitting information of the message processing unit, received from the representative determining unit, to the other message processing apparatus or all the other message processing apparatuses except the message processing apparatus having transmitted the information.

Accordingly, the message processing unit provided in each of the two or more message processing apparatuses connected to the message delivering apparatus processes a message transmitted from the publisher server and received via the message delivering apparatus. The representative determining unit compares predetermined information set in its own apparatus with predetermined information set in the other message processing apparatus or the other message processing apparatuses to determine whether or not the message processing unit provided in its own apparatus is a representative. The informing unit sends a notice depending on the message processed by the message processing unit when the representative determining unit determines the message processing unit as a representative. Additionally, the first broadcast unit provided in each of the message delivering apparatuses connected to the publisher server transmits a message received from the publisher server to all the message processing apparatuses, while the second broadcast unit transmits information of the message processing unit, received from the representative determining unit, to the other message processing apparatus or all the other message processing apparatuses except the message processing apparatus having transmitted the information.

The present invention also provide a message processing method for receiving a message from a publisher server and performing a process depending on the received message, a message delivering apparatus connected to the publisher server and including a first broadcast unit and a second broadcast unit, two or more message processing apparatuses connected to the message delivering apparatus and including a message processing unit, a representative determining unit and an informing unit, the method including the steps of: the first broadcast unit transmitting a message received from the publisher server to all the message processing apparatuses; the message processing unit processing the message received from the first broadcast unit; the second broadcast unit transmitting information of the message processing unit, received from the representative determining unit, to the other message processing apparatus or all the other message processing apparatuses except the message processing apparatus having transmitted the information; the representative determining unit determining whether or not the message processing unit provided in its own apparatus is a representative by comparing predetermined information set in its own apparatus with predetermined information set in the other message processing apparatus or the other message processing apparatuses; and the informing unit sending a notice depending on the message processed by the message processing unit when the representative determining unit determines the message processing unit as a representative.

Accordingly, the message processing unit provided in each of the two or more message processing apparatuses connected to the message delivering apparatus processes a message transmitted from the publisher server and received via the message delivering apparatus. The representative determining unit compares predetermined information set in its own apparatus with predetermined information set in the other message processing apparatus or the other message processing apparatuses to determine whether or not the message processing unit provided in its own apparatus is a representative. The informing unit sends a notice depending on the message processed by the message processing unit when the representative determining unit determines the message processing unit as a representative. Additionally, the first broadcast unit provided in each of the message delivering apparatuses connected to the publisher server transmits the message received from the publisher server to all the message processing apparatuses, while the second broadcast unit transmits information of the message processing unit, received from the representative determining unit, to the other message processing apparatus or all the other message processing apparatuses except the message processing apparatus having transmitted the information.

According to the present invention, a message processing system with improved, even excellent, maintainability can be provided, while ensuring availability.

DESCRIPTION OF AN EMBODIMENT OF THE INVENTION

Figure 1:
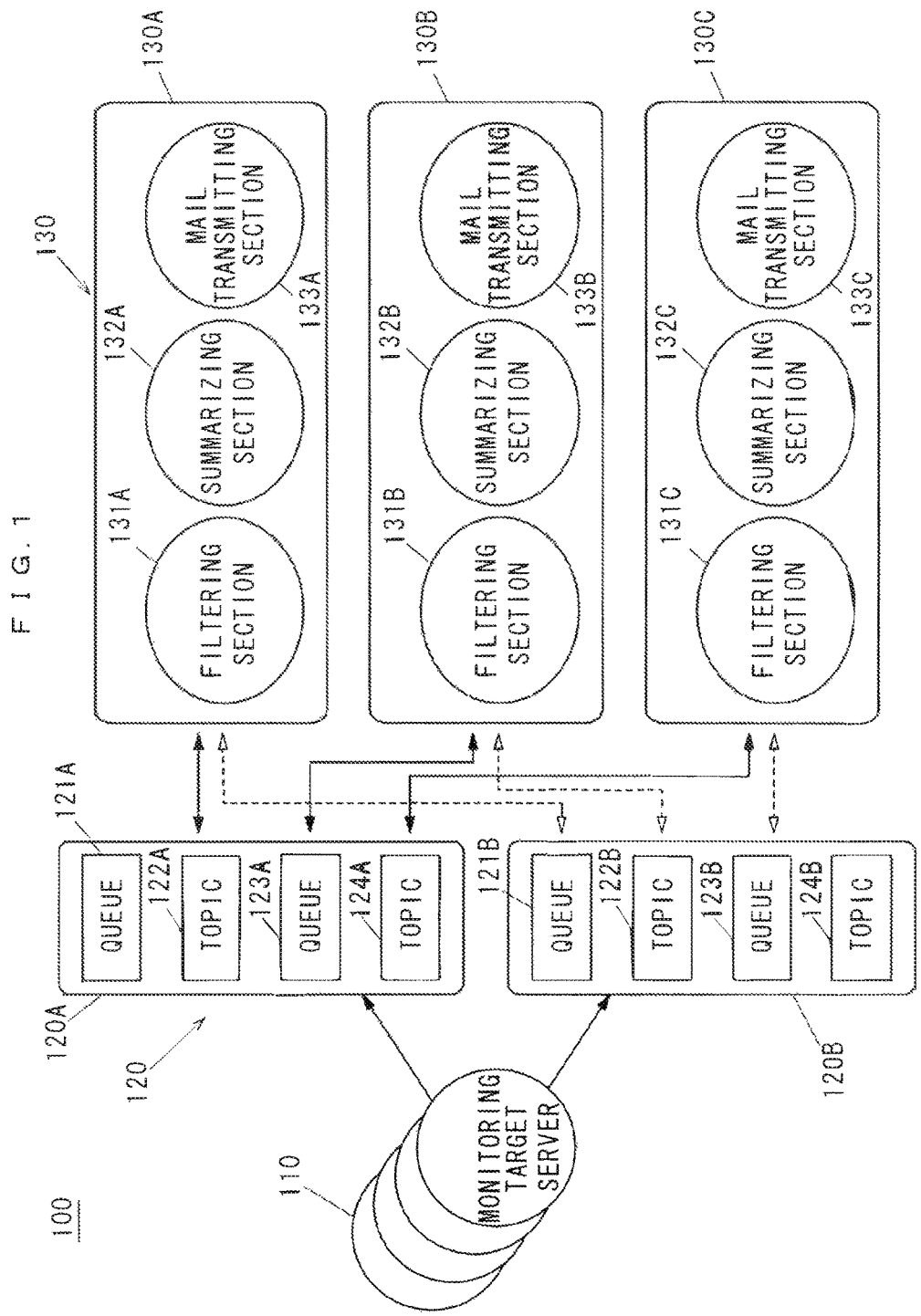
FIG. 1 is a diagram showing a configuration example of a system according to an embodiment.
Figure 2:
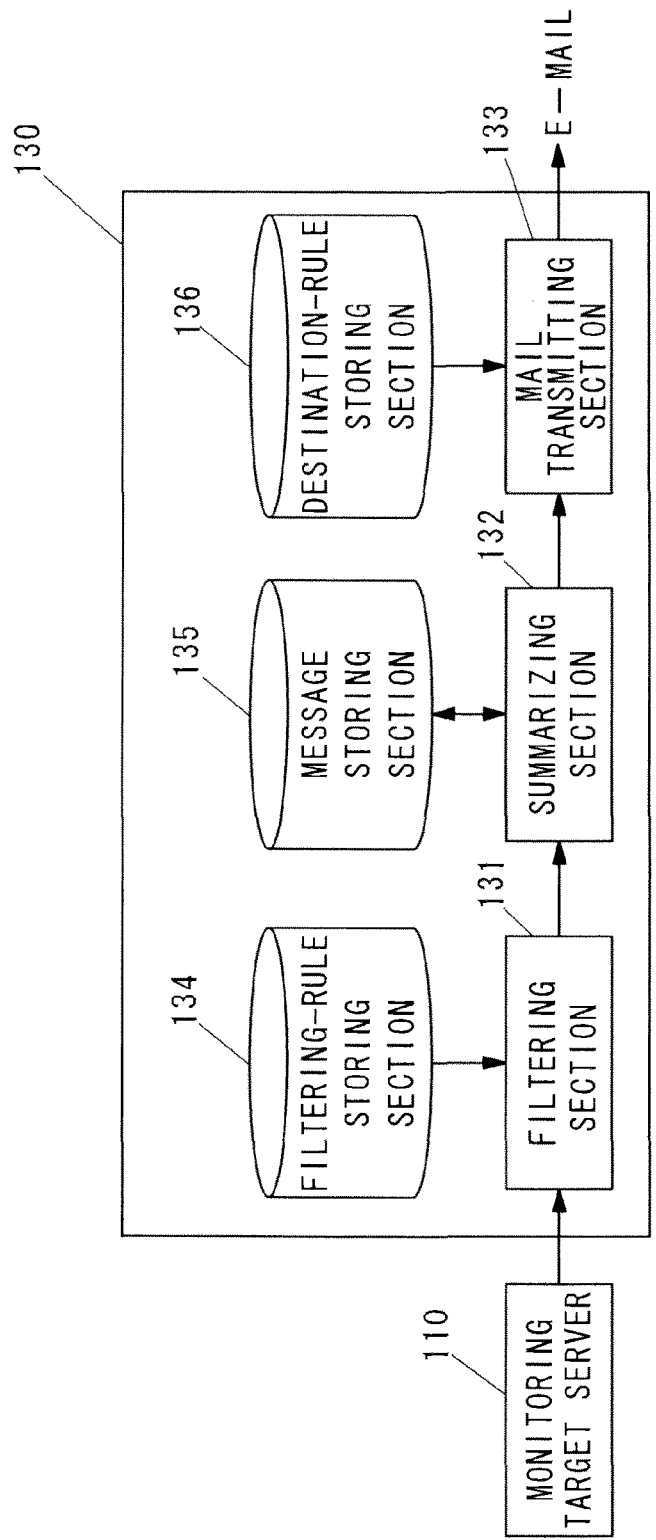
FIG. 2 is a schematic diagram showing an operation of a filter server.
Figure 3:
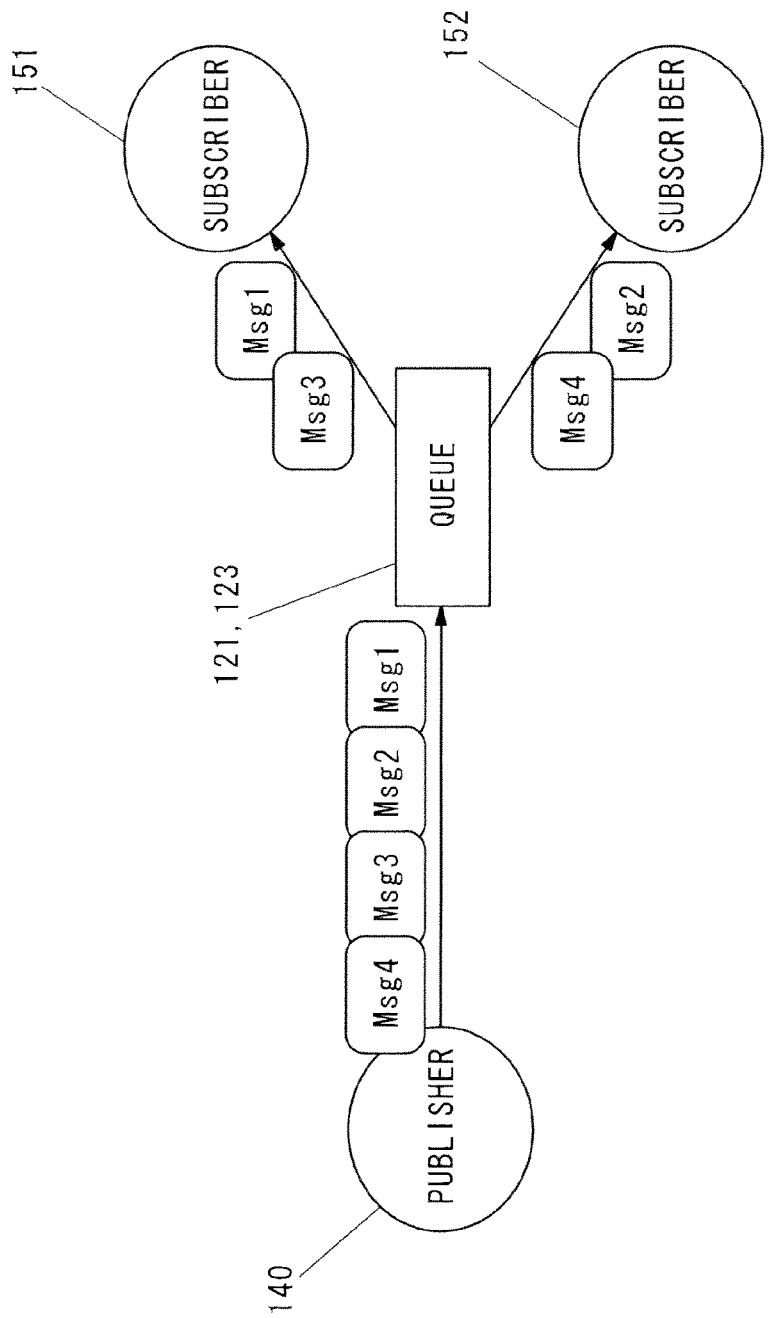
FIG. 3 is a schematic diagram showing an operation of a queue provided in an alert receiving server.
Figure 4:
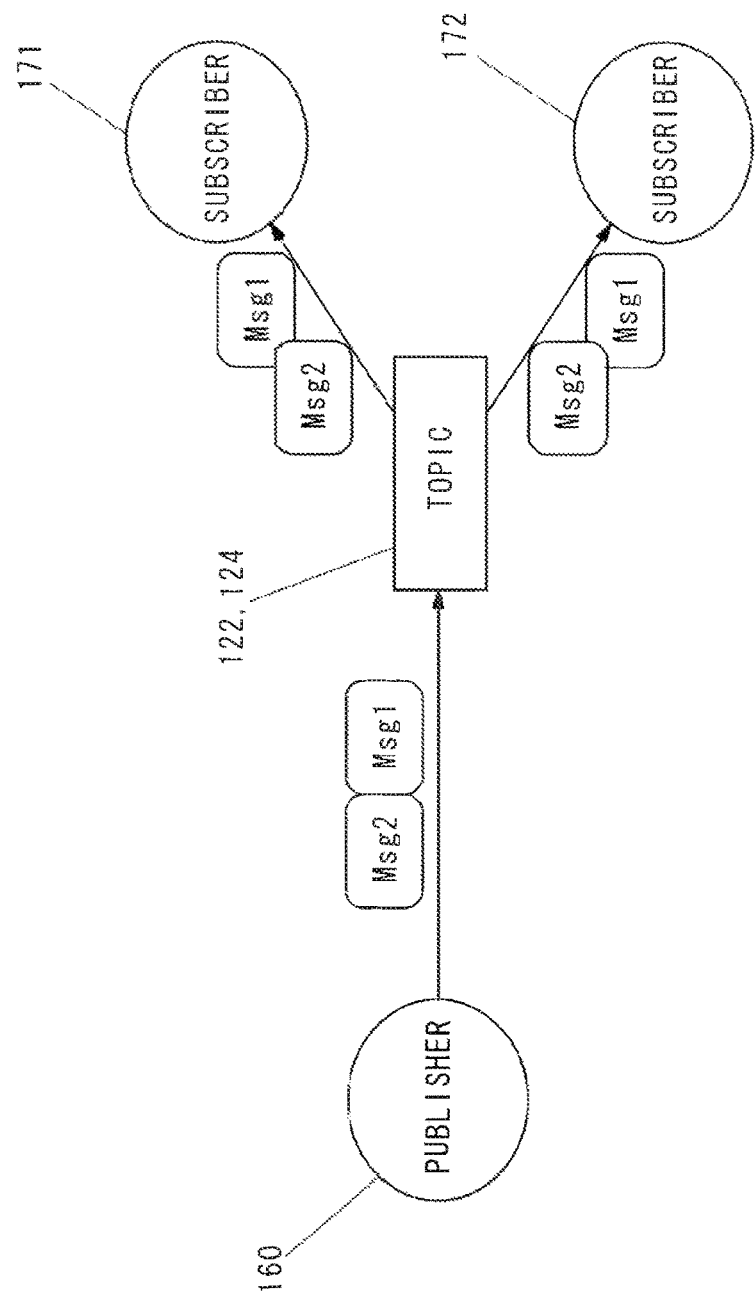
FIG. 4 is a schematic diagram showing an operation of a topic provided in the alert receiving server.
Figure 5:
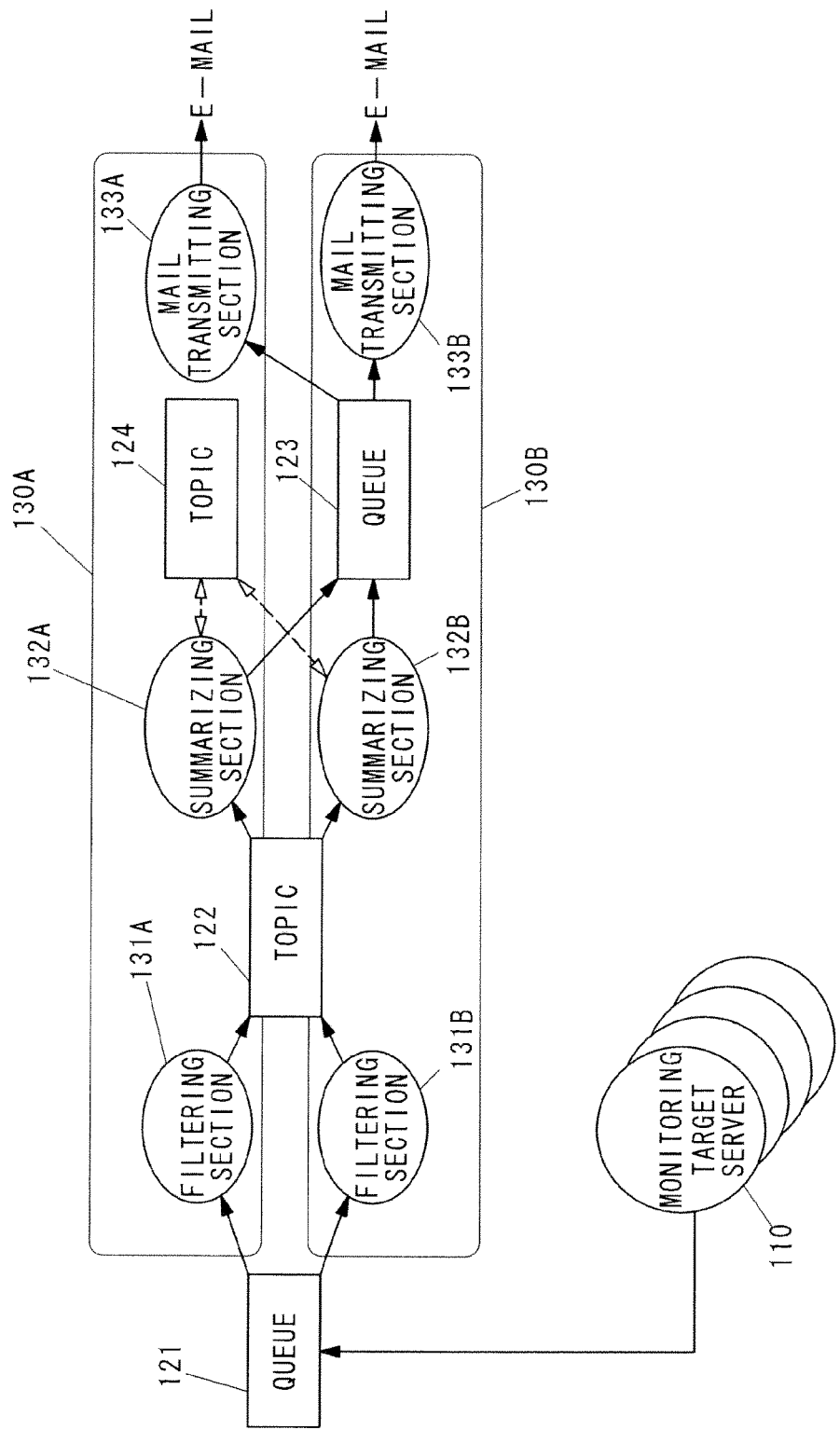
FIG. 5 is a schematic diagram showing an error message flow between servers.
Figure 6:
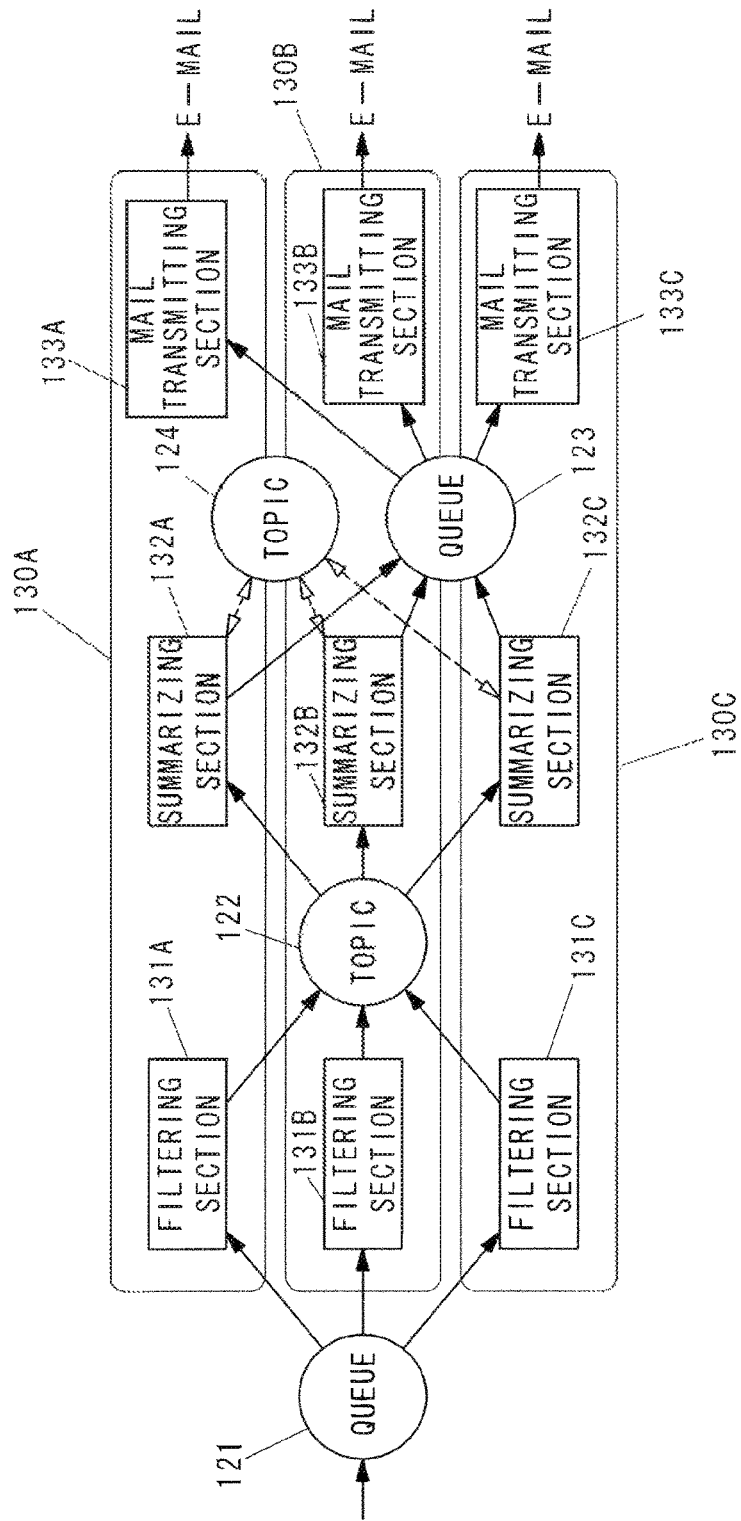
FIG. 6 is a diagram showing a state in which a filter server is added.
Figure 7:
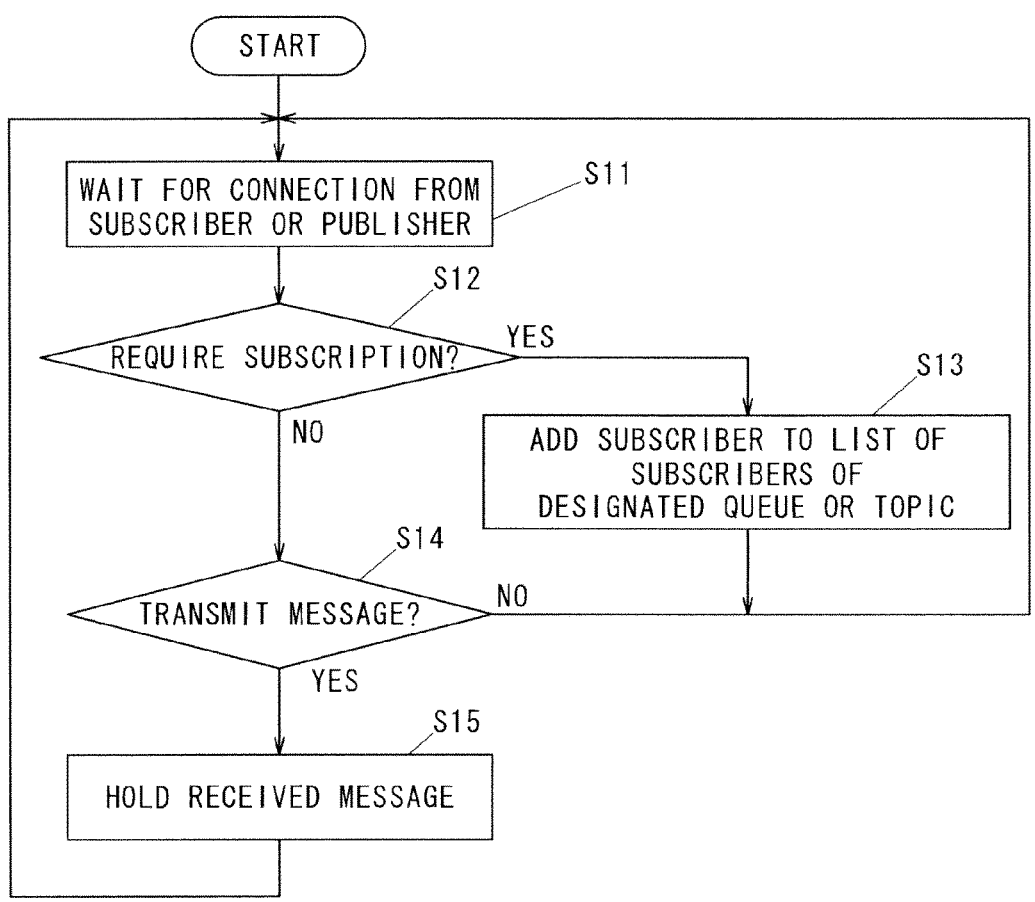
FIG. 7 is a flow chart showing a procedure for a process of making lists of subscribers for a queue and a topic in an alert receiving server.

Hereinafter, an embodiment of the present invention will be described in detail with reference to the drawings. As an initial matter, the drawings will be described in more detail, now:

FIG. 1
110 MONITORING TARGET SERVER
121A, 121B, 123A, 123B QUEUE
122A, 122B, 124A, 124B TOPIC
131A, 131B, 131C FILTERING SECTION
132A, 132B, 132C SUMMARIZING SECTION
133A, 133B, 133C MAIL TRANSMITTING SECTION
FIG. 2
110 MONITORING TARGET SERVER
131 FILTERING SECTION
132 SUMMARIZING SECTION
133 MAIL TRANSMITTING SECTION
134 FILTERING-RULE STORING SECTION
135 MESSAGE STORING SECTION
136 DESTINATION-RULE STORING SECTION
1 E-MAIL
FIG. 3
140 PUBLISHER
121, 123 QUEUE
151, 152 SUBSCRIBER
FIG. 4
160 PUBLISHER
122, 124 TOPIC
171, 172 SUBSCRIBER
FIG. 5
110 MONITORING TARGET SERVER
121, 123 QUEUE
122, 124 TOPIC
131A, 131B FILTERING SECTION
132A, 132B SUMMARIZING SECTION
133A, 133B MAIL TRANSMITTING SECTION
1 E-MAIL
FIG. 6
121, 123 QUEUE
122, 124 TOPIC
131A, 131B, 131C FILTERING SECTION
132A, 132B, 132C SUMMARIZING SECTION
133A, 133B, 133C MAIL TRANSMITTING SECTION
1 E-MAIL
FIG. 7
S11 WAIT FOR CONNECTION FROM SUBSCRIBER OR PUBLISHER
S12 REQUIRE SUBSCRIPTION?
S13 ADD SUBSCRIBER TO LIST OF SUBSCRIBERS OF DESIGNATED QUEUE OR TOPIC

Figure 8:
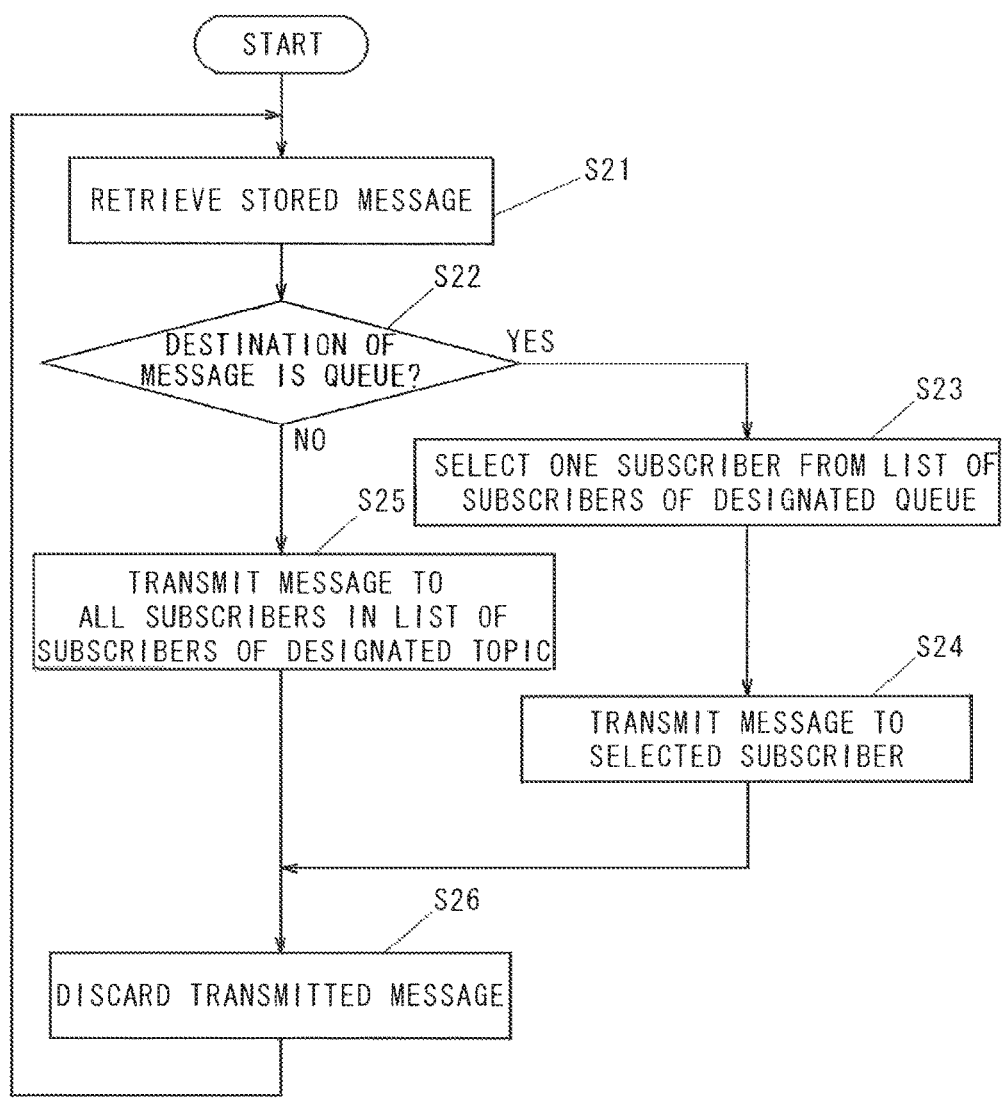
FIG. 8 is a flow chart showing a procedure for a process of transmitting a message by the queue and the topic in the alert receiving server.
Figure 9:
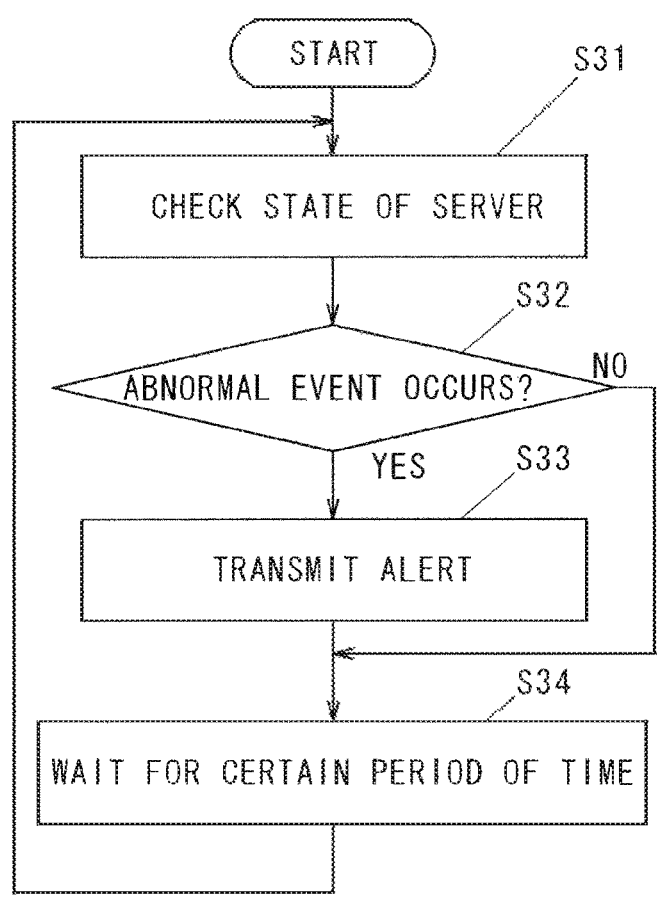
FIG. 9 is a flow chart showing a procedure for a process of monitoring a server by a monitoring program installed in a monitoring target server.
Figure 10:
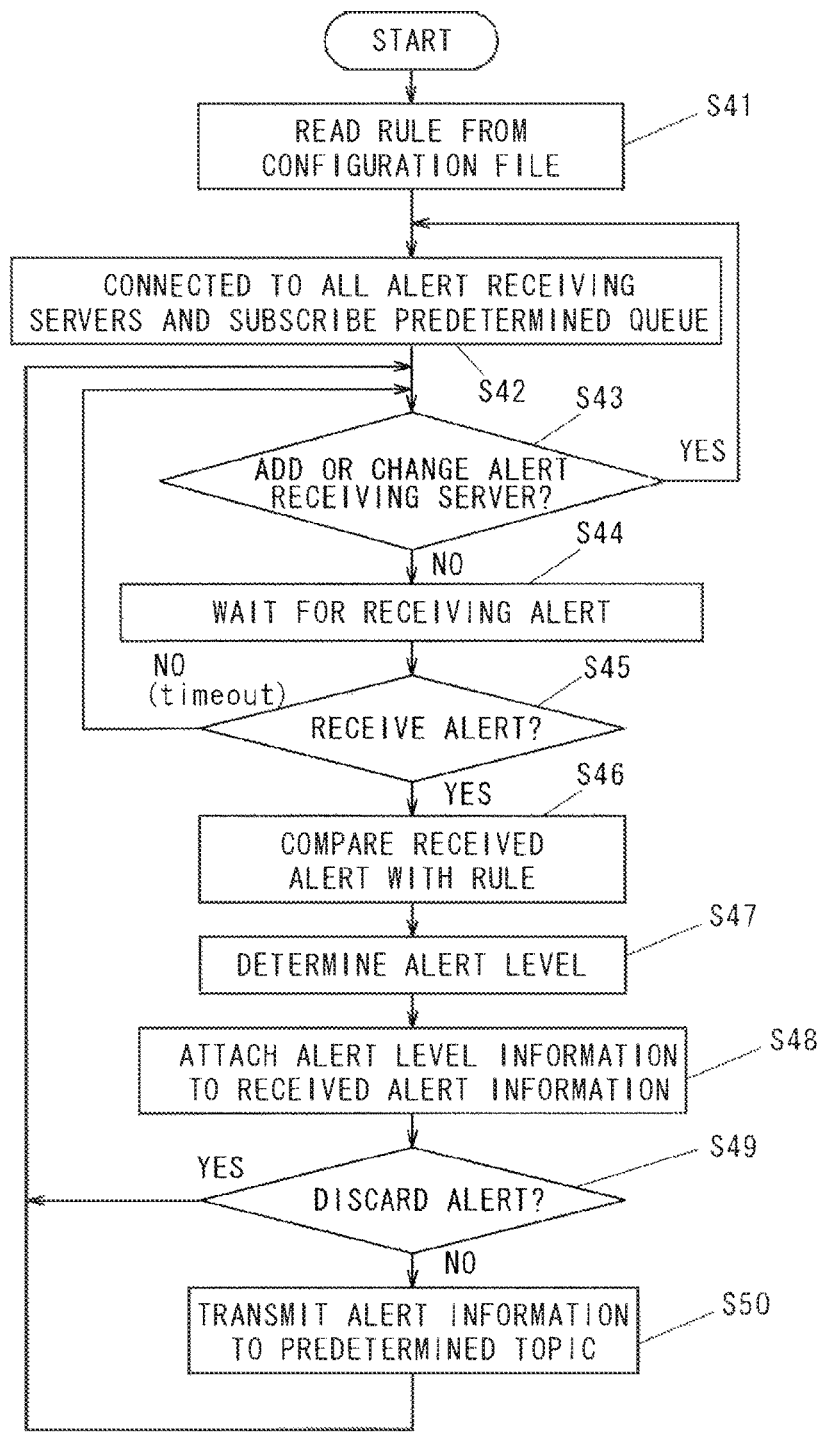
FIG. 10 is a flow chart showing a procedure for a process of filtering by a filtering section.
Figure 11:
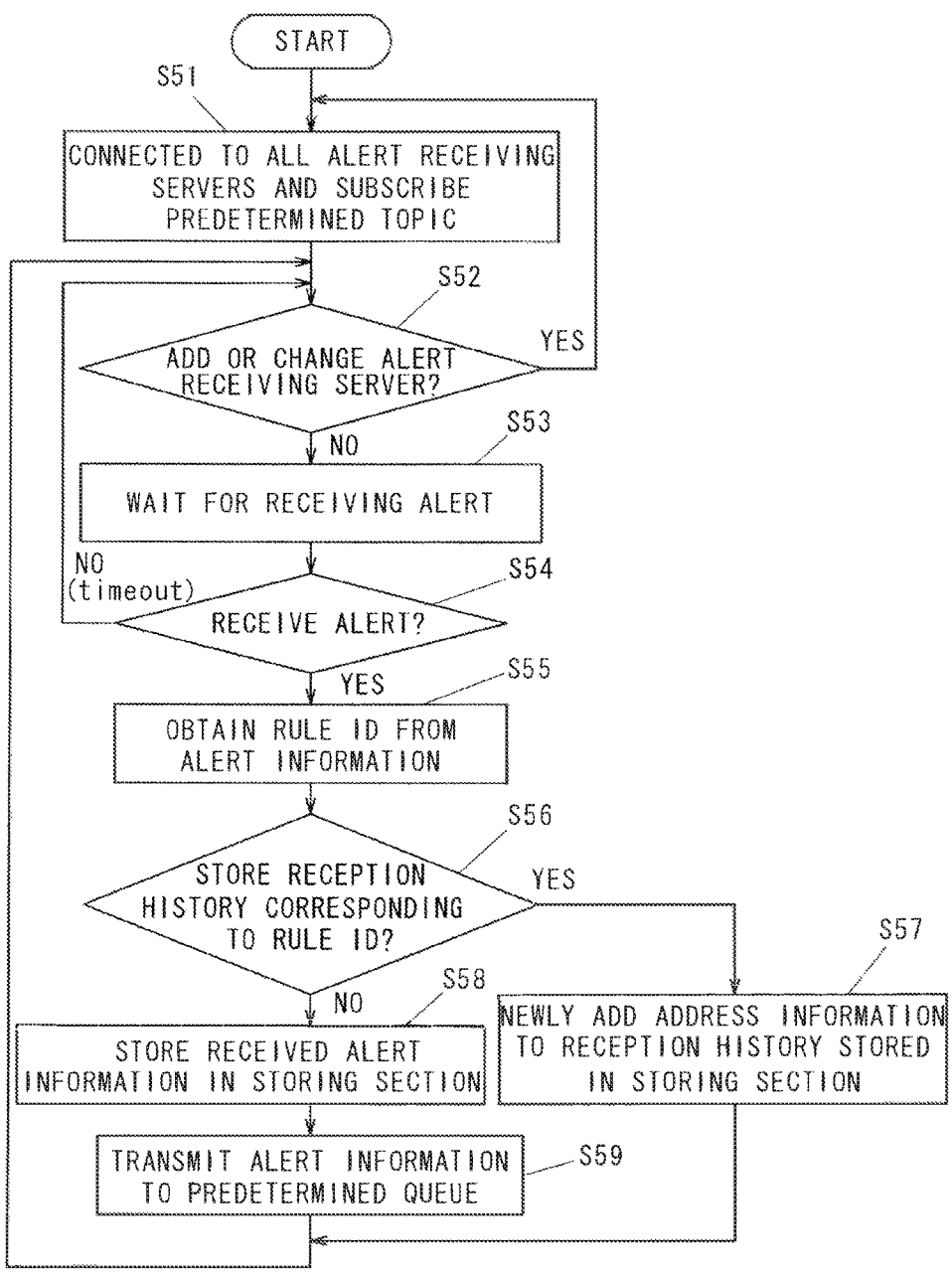
FIG. 11 is a flow chart showing a procedure for a process of storing an error message by a summarizing section.
Figure 12:
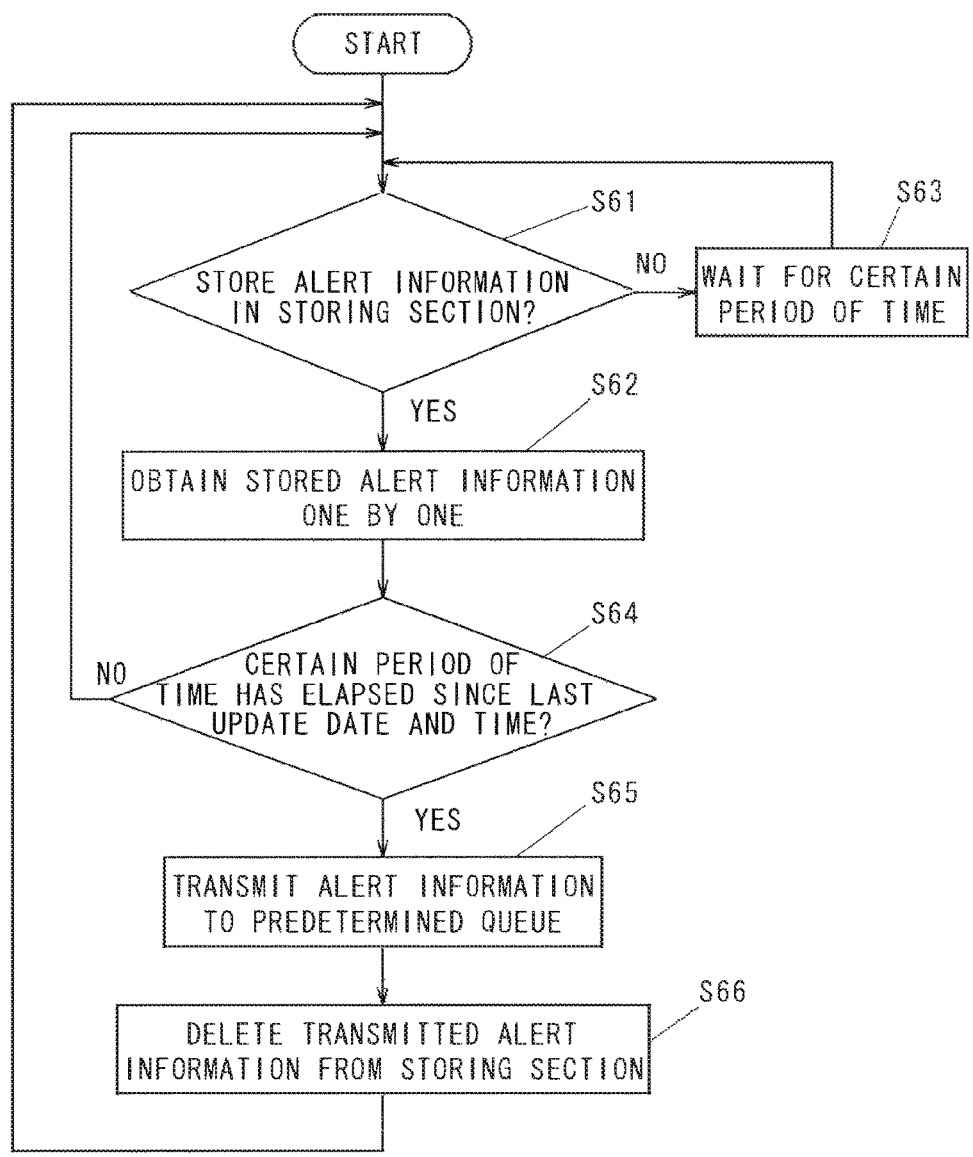
FIG. 12 is a flow chart showing a procedure for a process of transmitting an error message by the summarizing section.
Figure 13:
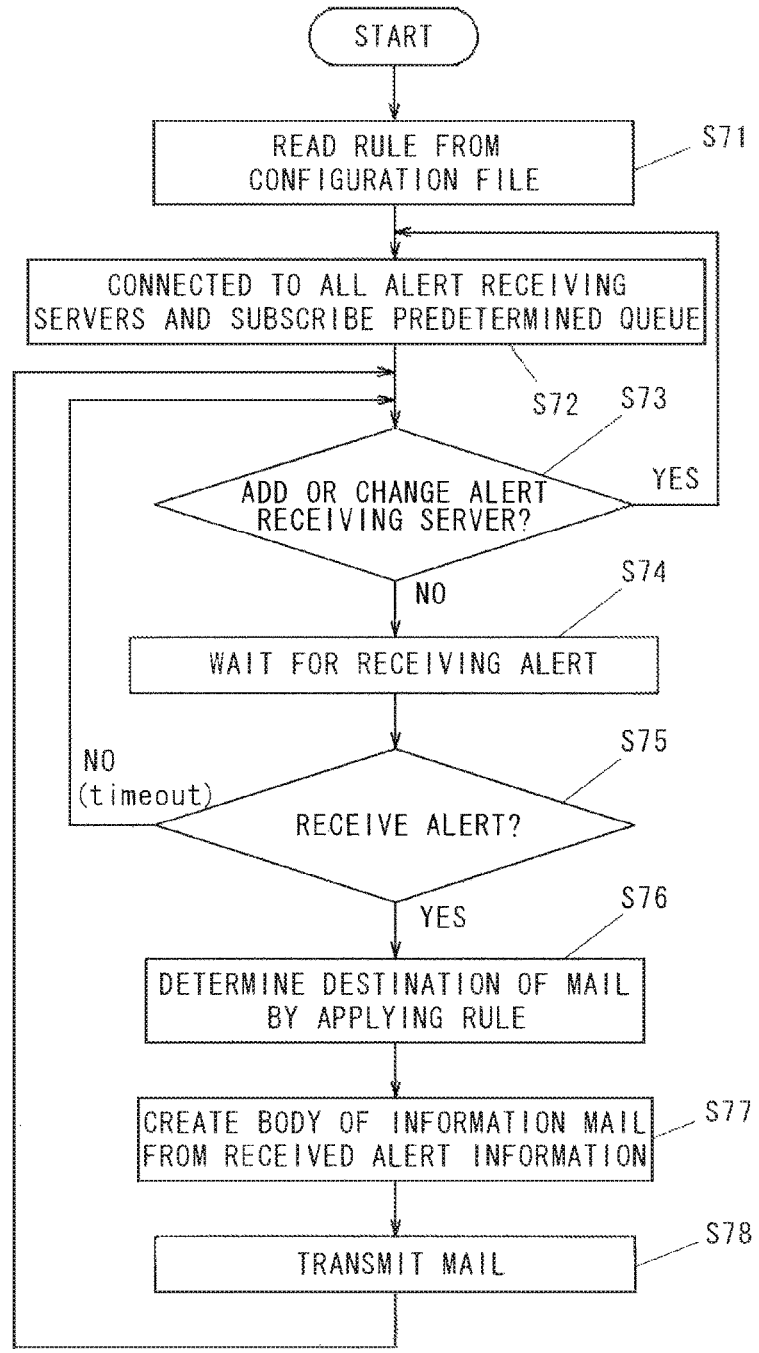
FIG. 13 is a flow chart showing a procedure for a process of transmitting mail by a mail transmitting section.
Figure 14:
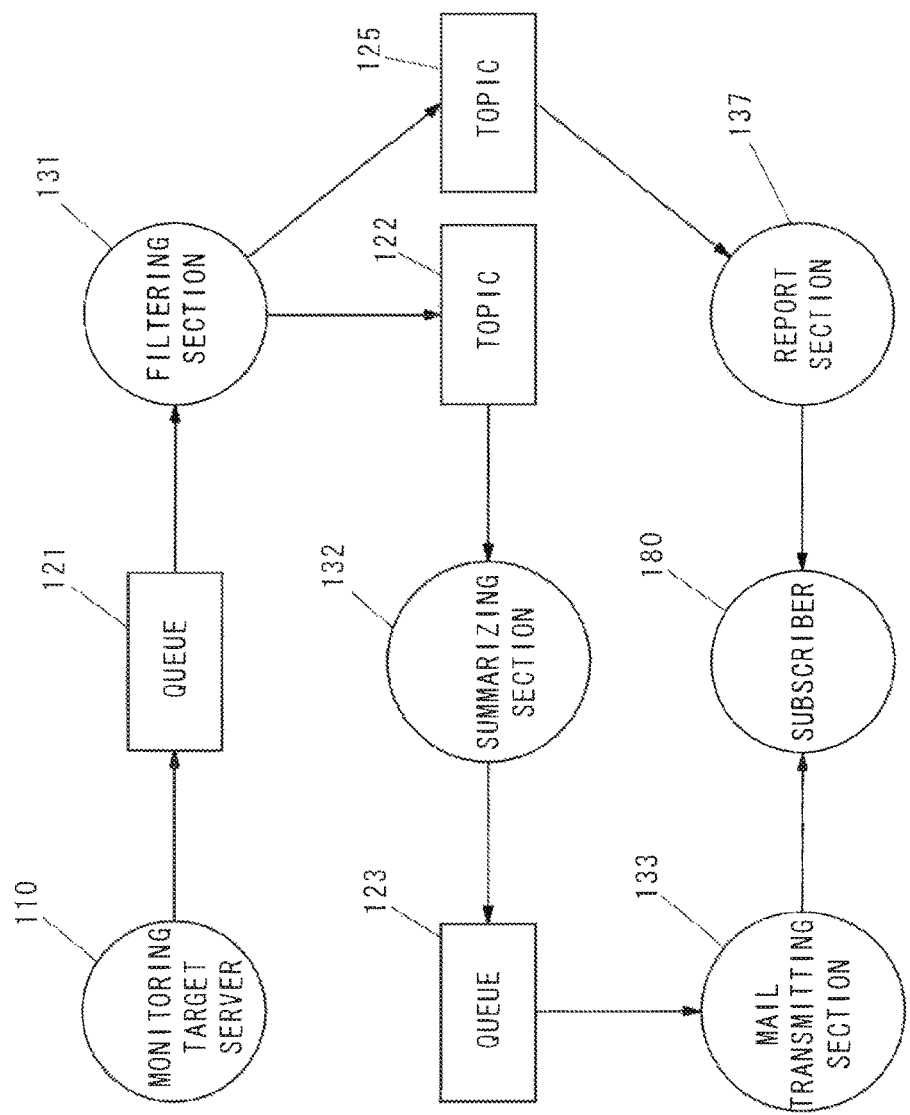
FIG. 14 is a schematic diagram showing an error message flow when the error message after the process of filtering is received by two topics.
Figure 15:
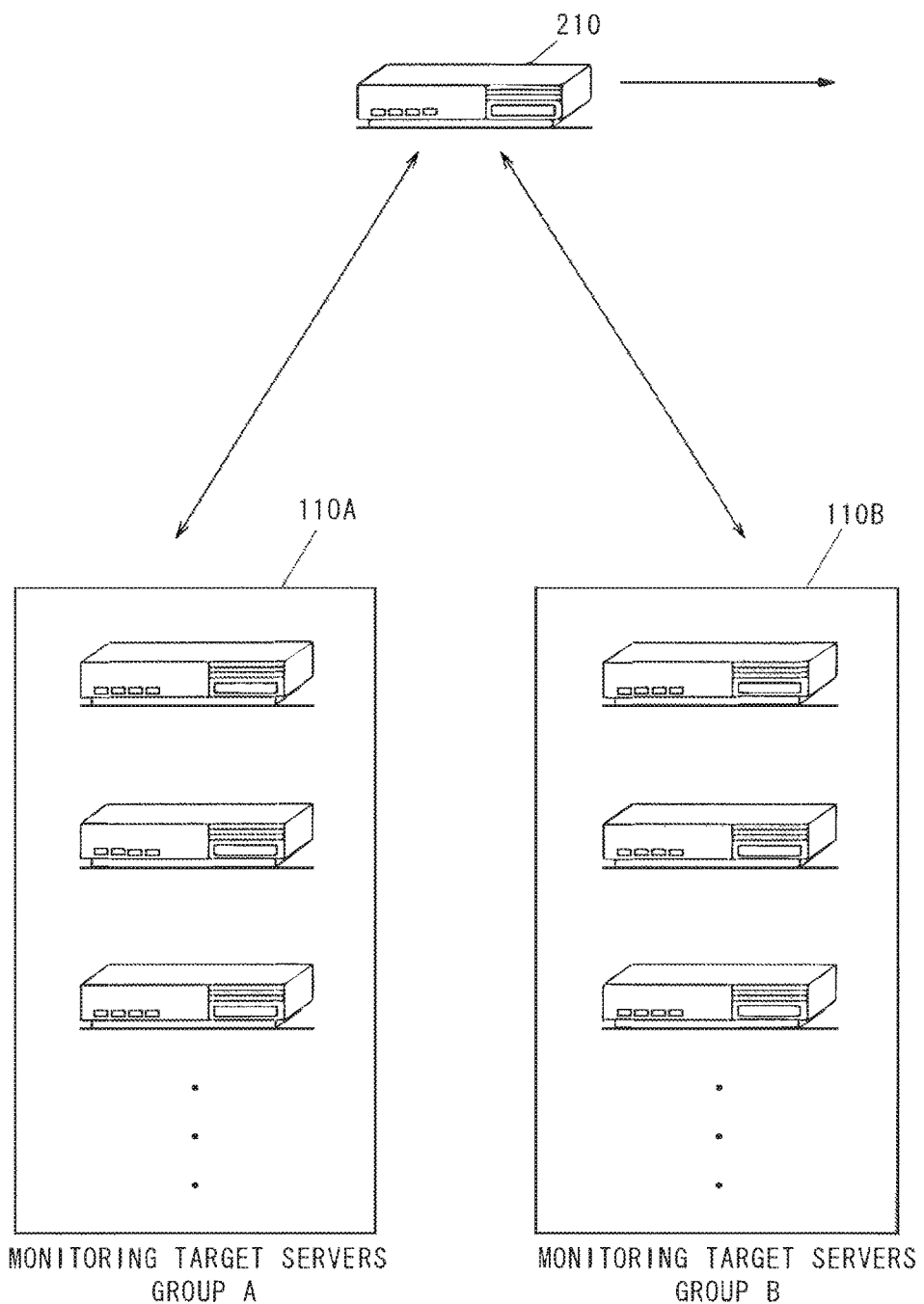
FIG. 15 is a diagram showing a configuration example of a conventional server monitoring system.

S14 TRANSMIT MESSAGE?
S15 HOLD RECEIVED MESSAGE
1 START
 FIG. 8
S21 RETRIEVE STORED MESSAGE
S22 DESTINATION OF MESSAGE IS QUEUE?
S23 SELECT ONE SUBSCRIBER FROM LIST OF SUBSCRIBERS OF DESIGNATED QUEUE
S24 TRANSMIT MESSAGE TO SELECTED SUBSCRIBER
S25 TRANSMIT MESSAGE TO ALL SUBSCRIBERS IN LIST OF SUBSCRIBERS OF DESIGNATED TOPIC
S26 DISCARD TRANSMITTED MESSAGE
1 START
 FIG. 9
S31 CHECK STATE OF SERVER
S32 ABNORMAL EVENT OCCURS?
S33 TRANSMIT ALERT
S34 WAIT FOR CERTAIN PERIOD OF TIME
1 START
 FIG. 10
S41 READ RULE FROM CONFIGURATION FILE
S42 CONNECTED TO ALL ALERT RECEIVING SERVERS AND SUBSCRIBE PREDETERMINED QUEUE
S43 ADD OR CHANGE ALERT RECEIVING SERVER?
S44 WAIT FOR RECEIVING ALERT
S45 RECEIVE ALERT?
S46 COMPARE RECEIVED ALERT WITH RULE
S47 DETERMINE ALERT LEVEL
S48 ATTACH ALERT LEVEL INFORMATION TO RECEIVED ALERT INFORMATION
S49 DISCARD ALERT?
S50 TRANSMIT ALERT INFORMATION TO PREDETERMINED TOPIC
1 START
 FIG. 11
S51 CONNECTED TO ALL ALERT RECEIVING SERVERS AND SUBSCRIBE PREDETERMINED TOPIC
S52 ADD OR CHANGE ALERT RECEIVING SERVER?
S53 WAIT FOR RECEIVING ALERT
S54 RECEIVE ALERT?
S55 OBTAIN RULE ID FROM ALERT INFORMATION
S56 STORE RECEPTION HISTORY CORRESPONDING TO RULE ID?
S57 NEWLY ADD ADDRESS INFORMATION TO RECEPTION HISTORY STORED IN STORING SECTION
S58 STORE RECEIVED ALERT INFORMATION IN STORING SECTION
S59 TRANSMIT ALERT INFORMATION TO PREDETERMINED QUEUE
1 START
 FIG. 12
S61 STORE ALERT INFORMATION IN STORING SECTION?
S62 OBTAIN STORED ALERT INFORMATION ONE BY ONE
S63 WAIT FOR CERTAIN PERIOD OF TIME
S64 CERTAIN PERIOD OF TIME HAS ELAPSED SINCE LAST UPDATE DATE AND TIME?
S65 TRANSMIT ALERT INFORMATION TO PREDETERMINED QUEUE
S66 DELETE TRANSMITTED ALERT INFORMATION FROM STORING SECTION
1 START
 FIG. 13
S71 READ RULE FROM CONFIGURATION FILE
S72 CONNECTED TO ALL ALERT RECEIVING SERVERS AND SUBSCRIBE PREDETERMINED QUEUE
S73 ADD OR CHANGE ALERT RECEIVING SERVER?
S74 WAIT FOR RECEIVING ALERT
S75 RECEIVE ALERT?
S76 DETERMINE DESTINATION OF MAIL BY APPLYING RULE
S77 CREATE BODY OF INFORMATION MAIL FROM RECEIVED ALERT INFORMATION
S78 TRANSMIT MAIL
1 START
 FIG. 14
110 MONITORING TARGET SERVER
121, 123 QUEUE
122, 125 TOPIC
131 FILTERING SECTION
132 SUMMARIZING SECTION
133 MAIL TRANSMITTING SECTION
137 REPORT SECTION
180 SUBSCRIBER
 FIG. 15
1 MONITORING TARGET SERVERS GROUP A
2 MONITORING TARGET SERVERS GROUP B

Now, a more detailed description of an embodiment of the invention will be provided:

1. Schematic Configuration of Whole Server Monitoring System

FIG. 1 is a diagram showing a configuration example of a system according to an embodiment.

As shown in FIG. 1, a server monitoring system 100 includes a monitoring target server 110, an alert receiving server 120, and a filter server 130.

The monitoring target server 110 is connected to the alert receiving server 120 to transmit a predetermined error message to the alert receiving server 120. The alert receiving server 120 is also connected to the filter server 130.

The monitoring target server 110 is a mail server, a WEB server, or the like. A program for checking a status of a server is executed in each of the servers. When the program detects an error in the server, an error message is transmitted to the alert receiving server 120. The monitoring target server 110 corresponds to a publisher server in the present invention.

The alert receiving server 120 includes queues 121 and 123, and topics 122 and 124. The filter server 130 includes a filtering section 131, a summarizing section 132, and a mail transmitting section 133. The alert receiving server 120 corresponds to a message delivering apparatus in the present invention.

The queue 121 transmits the error message received from the monitoring target server 110 to one of a plurality of filtering sections 131.

The topic 122 transmits the error message received from the filtering section 131 after a process of filtering to all of a plurality of summarizing sections 132.

The queue 123 transmits the error message received from the summarizing section 132 after a process of summarizing to one of a plurality of the mail transmitting sections 133.

The topic 124 transmits information received from the summarizing section 132 to summarizing sections 132 except the summarizing section 132 having transmitted the information. For example, the topic 124 transmits information received from a summarizing section 132A to summarizing sections 132B and 132C.

Providing a plurality of alert receiving servers 120 is preferred for load sharing. With a plurality of alert receiving servers 120, each of the monitoring target servers 110 is connected to a plurality of the alert receiving servers 120. The monitoring target server 110 selects one alert receiving server 120 from a plurality of the alert receiving servers 120 to transmit an error message to the selected alert receiving server 120. With a plurality of filter servers 130, each of the alert receiving servers 120 is connected to a plurality of the filter servers 130. The alert receiving server 120 transmits an error message to all the filter servers 130 or one of the filter servers 130 depending on a predetermined condition.

In the embodiment, description will be made, assuming that two alert receiving servers 120A and 120B, and three filter servers 130A, 130B and 130C are provided.

A queue 121A provided in the alert receiving server 120A and a queue 121B provided in the alert receiving server 120B have the same configuration. A topic 122A provided in the alert receiving server 120A and a topic 122E provided in the alert receiving server 120B also have the same configuration. Further, a queue 123A provided in the alert receiving server 120A and a queue 123B provided in the alert receiving server 120B have the same configuration. Furthermore, a topic 124A provided in the alert receiving server 120A and a topic 124B provided in the alert receiving server 120B have the same configuration. The topic 122 in the alert receiving server 120 corresponds to a first broadcast unit in the present invention, while the topic 124 in the alert receiving server 120 corresponds to a second broadcast unit in the present invention.

A filtering section 131A provided in the filter server 130A, a filtering section 131E provided in the filter server 130 B and a filtering section 131C provided in the filter server 130C have the same configuration. A summarizing section 132A provided in the filter server 130A, a summarizing section 132B provided in the filter server 130 B, and a summarizing section 132C provided in the filter server 130C also have the same configuration. Further, a mail transmitting section 133A provided in the filter server 130A, a mail transmitting section 133B provided in the filter server 130 B, and a mail transmitting section 133C provided in the filter serer 130C have the same configuration.

2. Configuration of Filter Server

FIG. 2 is a schematic diagram showing a configuration of a filter server.

As shown in FIG. 2, the filter server 130 includes the filtering section 131, the summarizing section 132, the mail transmitting section 133, a filtering-rule storing section 134, a message storing section 135, and a destination-rule storing section 136. The filter server 130 corresponds to a message processing apparatus in the present invention. The filtering section 131 and the summarizing section 132 correspond to a message processing unit in the present invention, while the mail transmitting section 133 corresponds to an informing unit in the present invention.

The filtering-rule storing section 134 is connected to the filtering section 131 to store a filtering rule used for a process of filtering by the filtering section 131. The message storing section 135 is connected to the summarizing section 132 to temporarily store an error message for a process of summarizing. The destination-rule storing section 136 is connected to the mail transmitting section 133 to store a destination rule. The destination rule is a condition for determining which destination e-mail is sent to depending on a type of the error message.

When receiving an error message transmitted from the monitoring target server 110, the filtering section 131 reads out a filtering rule stored in the filtering-rule storing section 134 to perform a process of filtering to the error message based on the filtering rule. The filtering section 131 transmits the error message subjected to the process of filtering to the alert receiving server 120. With a plurality of the alert receiving servers 120, the filtering section 131 transmits the error message to one of the alert receiving servers 120. When not being able to transmit the error message to an alert receiving server 120 selected as a destination, for example, when the alert receiving server 120 does not respond, the filtering section 131 preferably selects another alert receiving server 120 as a new destination. A method for selecting an alert receiving server 120 as a destination is not particularly limited, for example, it may be a round robin method or a method for random selection.

The filtering section 131 receives an error message from the queue 121 in the alert receiving server 120. The filtering section 131 periodically transmits a subscription signal to the queue 121 for receiving an error message from the queue 121.

The summarizing section 132 receives an error message from the topic 122 in the alert receiving server 120. The summarizing section 132 periodically transmits a subscription signal to the topic 122 for receiving an error message from the topic 122. The summarizing section 132 also receives information such as an IP address of a summarizing section 132 provided in another filter server 130 from the topic 124 in the alert receiving server 120. The summarizing section 132 periodically transmits a subscription signal also to the topic 124 for receiving information such as an IP address of a summarizing section 132 provided in another filter server 130 from the topic 124.

The mail transmitting section 133 receives an error message from the queue 123 in the alert receiving server 120. The mail transmitting section 133 periodically transmits a subscription signal to the queue 123 for receiving an error message from the queue 123.

The process of filtering by the filtering section 131 is performed, for example, by comparing a character string included in the error message with a character string set to the filtering rule and by attaching an identifier or the like associated with the corresponding character string and indicating a degree of importance of the error message.

An example of an error message will be shown as follows.
192.0.2.1, www, "82% used on/home"

It is assumed that the error message is separated by a comma and indicates an IP address of a monitoring target server 110 having transmitted the error message, a type of the monitoring target server 110, and contents of an alert from the top of the separated portions.

On the other hand, examples of a filtering rule will be shown as follows:

1, critical, "PHP Fatal error"
2, critical, "Table.* doesn't exist"
3, error, "% used on"
4, ignore, "Statement is not safe to log in statement format"

It is assumed that these filtering rules are separated by a comma and indicate a rule ID, an alert level, and a comparison character string from the top of the separated portions.

The filtering section 131 compares the received error message with each of the comparison character strings of the filtering rules. When the error message includes the comparison character string, the error message is determined to correspond to the corresponding filtering rule. When the received error message corresponds to a plurality of the filtering rules, it is assumed that the received error message corresponds to the filtering rule shown first among the corresponding filtering rules.

For example, when the filtering section 131 receives the above described error massage and performs a process of filtering based on the above filtering rules, an alert level is determined to be "error". This is because the error message includes a character string of "% used on" set to the rule ID3 in the filtering rules. Then, the resulting rule ID and the alert level are attached to the error message. An example of the error message subjected to the above process of filtering will be shown as follows:

192.0.2.1, www, "82% used on/home", 3, "error"

When receiving the error message subjected to the process of filtering from the filtering section 131, the summarizing section 132 performs a process of summarizing where error messages of the same type are summarized every certain period of time, while the error messages are temporarily stored in the message storing section 135. The summarizing section 132 transmits the error message subjected to the process of summarizing to the alert receiving server 120. With a plurality of the alert receiving servers 120, the error message is transmitted to one of the alert receiving servers 120. A method for selecting an alert receiving server 120 as a destination is not particularly limited, for example, it may be a round robin method or a method for random selection.

The summarizing section 132 performs a process of summarizing by summarizing error messages having the same rule ID into one error message.

The process of summarizing for summarizing messages will be performed as follows. That is, one or more error messages are obtained first whose rule IDs are the same by retrieving them from the message storing section 135. Next, the rule ID and the alert level attached by the filtering section 131 are removed from each of the obtained error messages. Then, the respective error messages are collected, thus obtaining one error message. After that, a common rule ID and alert level are attached to the error message after the collection.

An example of the error message after the process of summarizing will be shown as follows:

3, "error"
192.0.2.1, www, "82% used on/home"
192.0.2.4, www, "89% used on/home"
192.0.2.5, www, "81% used on/home"

According to the above example, one message is obtained by summarizing three error messages having the same type of alert level, namely the same rule ID3. Error messages received from three monitoring target servers 110 having the IP addresses of 192.0.2.1, 192.0.2.4, and 192.0.2.5 are summarized into one in the summarized error messages.

When receiving the error message subjected to the process of summarizing from the summarizing section 132, the mail transmitting section 133 transmits the error message by e-mail to a predetermined destination based on a destination rule stored in the destination-rule storing section.

When an alert level included in the error message corresponds to a character string indicating an alert level and included in the destination rule, the mail transmitting section 133 determines an associated mail address as a destination.

Examples of a destination rule will be shown as follows:
critical, alert-critical-ml@example.jp
error, alert-error-ml@example.jp When the error message after the process of summarizing is the one shown in the above [0000] and destination rules are the ones shown above, the mail transmitting section 133 determines the destination of e-mail to be "alert-error-ml@example.jp" because the alert level is "error".

As a result, the error message transmitted from the monitoring target server 110 is to be transmitted to a predetermined address. All of the error messages transmitted from the monitoring target server 110 are not transmitted as they are at this time, but a fewer error messages summarized by the process of summarizing are transmitted.

3. Configuration of Alert Receiving Server

As described above, the alert receiving server 120 includes the queue 121, the queue 123, the topic 122 and the topic 124.

FIG. 3 is a schematic diagram showing an operation of a queue provided in an alert receiving server.

As shown in FIG. 3, the queues 121 and 123 transmit messages Msgs 1 to 4 transmitted from a publisher 140 to any one of a plurality of subscribers 151 and 152.

With regard to the queue 121, the publisher 140 corresponds to the monitoring target server 110, and the subscribers 151 and 152 correspond to the filtering section 131. With regard to the queue 123, the publisher 140 corresponds to the summarizing section 132, and the subscribers 151 and 152 correspond to the mail transmitting section 133.

When receiving the messages from the publisher 140, the queues 121 and 123 temporarily store the messages to transmit them to the subscriber 171 or 172. At this time, the queues 121 and 123 transmit the messages in order of their arrival to the subscribers 151 and 152.

The queue 121 receives from the filtering section 131 in the filter server 130 a subscription signal for subscribing a message transmitted from the queue 121. The queue 121 makes a list of subscribers by using the received subscription signal. More specifically, the subscription signal includes an IP address and a port number of the filter sever 130 having transmitted the subscription signal. The queue 121 adds the IP address and port number included in the subscription signal to the list of subscribers. The queue 121 selects one combination among IP addresses and port numbers in the list of subscribers as a destination of a message. A method for selecting a destination is not particularly limited, for example, it may be a round robin method or a method for random selection. Additionally, when a subscription signal from a server included in the created list of subscribers is not received for a certain period of time or more, the queue 123 deletes the server from the list of subscribers.

The queue 123 also receives from the mail transmitting section 133 in the filter server 130 a subscription signal for subscribing a message transmitted from the queue 123. The queue 123 makes a list of subscribers by using the received subscription signal. More specifically, the subscription signal includes an IP address and a port number of the filter sever 130 having transmitted the subscription signal. The queue 123 adds the IP address and port number included in the subscription signal to the list of subscribers. The queue 123 selects one combination among IP addresses and port numbers in the list of subscribers as a destination of a message. Similarly to the queue 121, a method for selecting a destination is not particularly limited, for example, it may be a round robin method or a method for random selection.

In the case of three or more subscribers, the queue 123 transmits the message by selecting a subscriber one by one, as described above.

FIG. 4 is a schematic diagram showing an operation of a topic provided in the alert receiving server.

As shown in FIG. 4, the topic 122 transmits messages Msgs 1 and 2 transmitted from a publisher 160 to subscribers 171 and 172.

With regard to the topic 122, the publisher 160 corresponds to the filtering section 131, and the subscribers 171 and 172 correspond to all the summarizing sections 132. With regard to the topic 123, the publisher 160 corresponds to the summarizing section 132, and the subscribers 171 and 172 correspond to all the summarizing sections 132 except the publisher 160.

When receiving the messages from the publisher 160, the topics 122 and 124 temporarily store the messages to transmit them to the subscribers 151 and 152. In the case of three or more subscribers, the topic 122 and 124 transmit a message to all of the subscribers, as described above.

The topic 122 receives from the summarizing section 132 in the filter server 130 a subscription signal for subscribing a message transmitted from the topic 122. The topic 122 makes a list of subscribers by using the received subscription signal. More specifically, the subscription signal includes an IP address and a port number of the filter sever 130 having transmitted the subscription signal. The topic 122 adds the IP address and port number included in the subscription signal to the list of subscribers. The topic 122 selects all IP addresses and port numbers in the list of subscribers as a destination of a message.

The topic 124 also receives from the summarizing section 132 in the filter server 130 a subscription signal for subscribing a message transmitted from the topic 124. The topic 124 makes a list of subscribers by using the received subscription signal. More specifically, the subscription signal includes an IP address and a port number of the filter sever 130 having transmitted the subscription signal. The topic 124 adds the IP address and port number included in the subscription signal to the list of subscribers. The topic 124 selects everything except the IP address and port number of the publisher in the list of subscribers as a destination of a message.

4. Communication Between Servers

FIG. 5 is a schematic diagram showing an error message flow between servers.

As shown in FIG. 5, the queue 121 temporarily stores an error message when receiving the error message transmitted from the monitoring target server 110. Then, the queue 121 transmits the error message to the filtering section 131A in the filter server 130A or the filtering section 131B of the filter server 130B.

The reason why the queue 121 temporarily stores the error message before transmitting it to the filtering section 131 will be described below. That is, the monitoring target server 110 has only to transmit an error message, and therefore, directly transmitting an error message to the filter server 130 in a busy state may not allow the filter server 130 to transmit data of the error message to a person in charge. Moreover, when the monitoring target server 110 is standing by for transmitting an error message to the filter server 130, a serious failure that the monitoring target server 110 cannot transmit the error message may occur. Temporarily storing an error message by the queue 121 can prevent a state where a person in charge cannot receive the error message. Hereinafter, the topic 122, queue 123 and topic 124 also temporarily store a received error message for the same reason.

When receiving the error message from the queue 121, the filtering section 131 attaches an identifier or the like indicating a degree of importance to the error message as a process of filtering for the error message to transmit the error message to the topic 122.

When receiving the error message from the filtering section 131, the topic 122 temporarily stores the error message to transmit it to both of the summarizing sections 132A and 132B.

When receiving the error message from the topic 122, the summarizing section 132 keeps storing the error message for a certain period of time to perform a process of summarizing for summarizing error messages of the same type. Then, the summarizing section 132 transmits the summarized error message to the queue 123.

The summarizing sections 132A and 132B are adapted to receive the same error message and perform the same process of summarizing. However, when both of the summarizing sections 132A and 132B transmit the same summarizing processed results to the queue 123, a person in charge of failure receives a large amount of e-mail. Disadvantageously, this leads to difficulty of grasping a situation immediately. Therefore, either of the summarizing section 132A or 132B transmits a summarized error message to the queue 123. Next will be described is representative determination for determining which summarizing section transmits the summarized error message to the queue 123, the summarizing section 132A or 132B.

The summarizing section 132 periodically transmits information of its own apparatus to the topic 124. The topic 124 transmits the transmitted information to all of the summarizing sections 132 except the summarizing section 132 having transmitted the information.

More specifically, when the summarizing section 132A transmits information of its own apparatus to the topic 124, the topic 124 transmits the information to the summarizing section 132B, or a summarizing section except the summarizing section 132A having transmitted the information. Similarly, when the summarizing section 132B transmits information of its own apparatus to the topic 124, the topic 124 transmits the information to the summarizing section 132A, or a summarizing section except the summarizing section 132E having transmitted the information. Such a configuration allows all the summarizing sections 132 to have information about summarizing sections 132 in all the filter servers 130 in operation.

Then, the summarizing section 132 determines whether its own apparatus is a representative or not based on information of all the summarizing sections 132. For example, it is assumed that information sharing with respective summarizing sections 132 is an IP address set to each filter server and a smallest value included in an IP address is a determinant factor of a representative. Each of the summarizing sections 132 compares its own IP address with an IP address transmitted from the other summarizing section 132. When determining that a value included in its own IP address is the smallest, the summarizing section 132 determines itself as a representative.

Since only two filter servers 130 are shown in FIG. 5, information is transmitted only to the other summarizing section 132 that is not a publisher. However, in the case of three or more filter servers 130, information is transmitted to all of the summarizing sections 132 except a publisher, namely two or more summarizing sections 132. The summarizing section 132 determines itself as a representative when the value included in the IP address is the smallest. However, the summarizing section 132 may determine itself as a representative when the value included in the IP address is the largest. As described above the summarizing section 132 and the topic 124 correspond to a representative determining unit in the present invention.

When receiving the error message from the summarizing section 132A or 132B, the queue 123 temporarily stores the error message to transmit it to the mail transmitting section 133A or 133B.

When receiving the error message from the queue 123, the mail transmitting section 133 transmits the error massage by e-mail to a person in charge based on a predetermined destination rule.

As described above, the error message transmitted from the monitoring target server 110 is transmitted as e-mail after transmission/reception between the alert receiving servers 120 and the filter servers 130. Such a configuration prevents destinations of error messages from being concentrated in a specific server, thereby sharing a load. Additionally, a plurality of alert receiving servers 120 and filter servers 130 are provided for redundancy, thereby ensuring availability.

In other words, in any phase of transmission of an error message from the monitoring target server 110 to the queue 121, from the queue 121 to the filtering section 131, from the filtering section 131 to the topic 122, from the topic 122 to the summarizing section 132, from the summarizing section 132 to the queue 123 and from the queue 123 to the mail transmitting section 133, even if any of the servers goes down, another server having the same configuration as the server having been down exist. This therefore ensures redundancy.

An error message is transmitted to any one of a plurality of components in a case such as the cases where an error message is transmitted from the monitoring target server 110 to the queue 121, from the queue 121 to the filtering section 131, from the filtering section 131 to the topic 122, from the summarizing section 132 to the queue 123 and from the queue 123 to the mail transmitting section 133. Therefore, a load is shared in such a configuration different from a complete mirror configuration.

The description has been made showing two filter servers 130 in FIG. 5 for simple operation, while, in FIG. 6, it will be described how respective functions of alert receiving servers 120 and filter servers 130 operate when the number of filter servers 130 is increased from two to three.

FIG. 6 is a diagram showing a state in which a filter server is added.

The queue 121 receives from the filtering section 131 in the filter server 130 a subscription signal for subscribing a message transmitted from the queue 121. The queue 121 makes a list of subscribers by using the received subscription signal. More specifically, the subscription signal includes an IP address and a port number of the filter sever 130 having transmitted the subscription signal. The queue 121 adds the IP address and port number included in the subscription signal to the list of subscribers. The queue 121 selects one combination among IP addresses and port numbers in the list of subscribers as a destination of an error message to transmit the error message to any one of the filtering sections 131A, 131B and 131C.

When receiving the error message, the filtering section 131 transmits the error message subjected to the process of filtering to the topic 122. The topic 122 transmits the received error message to all of the summarizing sections 132A, 132B and 132C.

An operation at the time of the topic 122 transmitting the error message to the summarizing section 132 is similar to that of the queue 121 described above. That is, the topic 122 receives from the summarizing section 132 in the filter server 130 a subscription signal for subscribing a message transmitted from the topic 122. The topic 122 makes a list of subscribers by using the received subscription signal. More specifically, the subscription signal includes an IP address and a port number of the filter sever 130 having transmitted the subscription signal. The topic 122 adds the IP address and port number included in the subscription signal to the list of subscribers. The topic 122 selects all IP addresses and port numbers in the list of subscribers as a destination of an error message to transmit the received error message to all of the summarizing sections 132A, 132B and 132C.

With such a configuration, when the filter server 130C is added as a part of the server monitoring system 100, an administrator prepares a filter server 130C having the same configuration as the filter servers 130A and 130B. In that case, the filter server 130C can function immediately as a part of the server monitoring system 100, thereby achieving a system with excellent extensibility.

Since the summarizing sections 132A, 132B and 132C receive the same error messages from the topic 122 and the configurations of the summarizing sections 132A, 132B and 132C are the same, the summarizing sections 132A, 132B and 132C perform a process of summarizing to the same error messages based on the same rule.

This is because the process of summarizing is for reducing the total number of error messages transmitted from the server monitoring system 100 by summarizing error messages transmitted for a certain period of time. If error messages are dispersedly transmitted to the summarizing sections 132A, B and C, results of respective processes of summarizing vary, which is inappropriate.

On the other hand, when each of the summarizing sections 132A, 132B and 132C transmits the result after the same process of summarizing to queue 123, a problem of transmitting the same messages arises. Therefore, a method for detei mining which one of the summarizing sections 132A, B and C transmits an error message to the queue 123 will be considered.

The topic 124 is connected to the summarizing sections 132A, 132B and 132C, each of which transmits its own information to the topic 124. The topic 124 transmits the received information of the summarizing section 132 to summarizing sections 132 except the summarizing section 132 of a publisher. For example, when the summarizing section 132A transmits its own information to the topic 124, the topic 124 transmits the received information to the summarizing sections 132B and 132C. This allows each of the summarizing sections 132 to have information of summarizing sections 132 provided in the other filter servers 130. The information includes, for example, an IP address of the filter server 130.

Assuming a summarizing section having a smallest IP address to be a representative, for example, each of the summarizing sections 132A, 132B and 1320 determines whether itself is a representative or not based on the information received from the topic 124. The summarizing section 132 having determined itself as a representative transmits the error message after the process of summarizing to the queue 123. The other summarizing sections 132 do not transmit the error message.

The case where each of the summarizing sections 132A, 132B and 132C performs the process of summarizing has been described, however, the present invention is not limited thereto. For example, the summarizing sections 132A, 132B and 132C may perform the process of summarizing only when being selected as a representative.

Each process of the server monitoring system 100 having the above functions will be described in detail with flow charts.

5. Operation of Server Monitoring System

5.1 Process of Making List of Subscribers

FIG. 7 is a flow chart showing a procedure for a process of making lists of subscribers for a queue and a topic in an alert receiving server. Hereinafter, the process of making a list of subscribers shown in FIG. 7 will be described according to the step numbers.

[Step S11]

A queue and a topic provided in an alert receiving server 120 wait for receiving an error message or a subscription signal from a subscriber. The subscriber is a destination to which the queue and topic transmit a message, for example, a subscriber of the queue 121 is the filtering section 131.

[Step S12]

The queue and the topic provided in the alert receiving server 120 determine whether a subscription signal from the subscriber is received or not. The process proceeds to step S13 when the subscription signal is received, while the process proceeds to step S14 when the subscription signal is not received.

[Step S13]

The queue and the topic provided in the alert receiving server 120 add the subscriber having transmitted the subscription signal to a list of subscribers.

[Step S14]

The queue and the topic provided in the alert receiving server 120 determine whether an error message is received from a predetermined publisher or not. The process proceeds to step S15 when the error message is received, while the process returns to step S11 when the error message is not received.

[Step S15]

The queue and the topic provided in the alert receiving server 120 temporarily store the received message and prepare for transmitting the error message to the subscriber or publisher.

Next will be described is a process of transmitting the error message to the subscriber or publisher by the alert receiving server 120.

5.2 Process of Transmitting Message by Alert Receiving Server

FIG. 8 is a flow chart showing a procedure for a process of transmitting a message by the queue and the topic in the alert receiving server. Hereinafter, the process of making a list of subscribers shown in FIG. 8 will be described according to the step numbers.

[Step S21]

The alert receiving server 120 reads out the error message received and temporarily stored.

[Step S22]

The alert receiving server 120 determines whether a destination of the read-out error message is the queue or not. The process proceeds to step S23 when the destination is the queue, while the process proceeds to step S25, when the destination is not the queue, namely the topic.

[Step S23]

The alert receiving server 120 selects one subscriber from a list of subscribers associated with the queue, or the destination of the read-out error message.

[Step S24]

The alert receiving server 120 transmits the error message to the selected subscriber.

[Step S25]

The alert receiving server 120 transmits the error message to all subscribers in a list of subscribers associated with the topic, or the destination of the read-out error message.

[Step S26]

The alert receiving server 120 discards the transmitted error message.

5.3 Process of Monitoring Server

FIG. 9 is a flow chart showing a procedure for a process of monitoring a server by a monitoring program installed in a monitoring target server. Hereinafter, the process shown in FIG. 9 will be described according to the step numbers.

[Step S31]

The monitoring target server 110 executes a program for checking a state of the monitoring server 110 (hereinafter, referred to as a monitoring program) to check the state of the monitoring target server 110.

[Step S32]

The monitoring program determines whether an abnormal event occurs or not in the monitoring target server 110. The process proceeds to step S33 when the abnormal event is determined to occur in the monitoring target server 110, while the process proceeds to step S34 when the abnormal event is determined not to occur. An example of the abnormal event having occurred in the monitoring target server 110 includes a situation where a remaining capacity of a disk of the monitoring target server 110 reaches a predetermined rate or less.

[Step S33]

The monitoring program transmits to the alert receiving server 120 an error message, or information associated with the abnormal event having occurred in the monitoring target server 110. With a plurality of the alert receiving servers 120, an alert receiving server of a destination is changed every time an error message is transmitted in order to avoid concentration of loads in a certain alert receiving server.

When transmitting the error message to the alert receiving server 120, the monitoring program refers to a DS N server for an IP address of the alert receiving server 120 based on a domain name of the alert receiving server 120 previously set in the monitoring program. Even if a plurality of alert receiving servers 120 exist, each of the alert receiving servers 120 has a common domain name. The DNS server stores a list of IP addresses of respective alert receiving servers associated with domain names of the alert receiving servers 120. Then, the monitoring program receives the list associated with domain names of the alert receiving servers 120 and randomly selects one IP address from a plurality of IP addresses set in the list. The monitoring program then transmits the error message to the queue 121 in the alert receiving server 120 having the address attached.

The monitoring program may directly transmit the error message to the filtering section 131 in the filter server 130. However, since the filter server 130 performs processes of filtering and summarizing and transmits mail, a load thereof is likely to be increased. Therefore, the filtering section 131 in the filter server 130 may not receive the error message transmitted from the monitoring program when the filter server 130 is in a busy state.

According to the server monitoring system 100 in the embodiment, an error message is transmitted to the filtering section 131 via the queue 121. Since the queue 121 temporarily stores the error message, the monitoring program can transmit the message even when the filter server 130 is in a busy state. This also enables avoiding problems such as a loss of an error message and omission of monitoring for the monitoring target server. After recovering from the busy state, the filter server 130 can receive the stored error message from the queue 121. Subsequent processes therefore can be continued without any problems.

[Step S34]

The monitoring program is in a standby state for a certain period of time. For example, the monitoring program waits for five minutes when a determination program for determining whether an abnormal event occurs in a server or not is executed every five minutes.

When the abnormal event occurs in the monitoring target server 110, either of the alert receiving server 120A or 120E is informed about contents thereof as an error message by performing such a process.

As described above, when the alert receiving server 120 receives the error message from the monitoring program, the queue 121 installed in the alert receiving server 120 transmits the error message to the filter server 130. With a plurality of the filter servers 130 at this time, a filter server of a destination is changed every time an error message is transmitted in order to avoid concentration of loads in a certain filter server. Further, when the filter server designated as a destination does not respond, redundancy can be achieved by changing a destination to another filter server.

5.4 Process of Filtering

FIG. 10 is a flow chart showing a procedure for a process of filtering by a filtering section in a filter server. Hereinafter, the process of filtering shown in FIG. 10 will be described according to the step numbers.

[Step S41]

The filtering section 131 reads a filtering rule stored in the filtering-rule storing section 134.

[Step S42]

The filtering section 131 is connected all the alert receiving servers 120 to transmit to the queue 121 a subscription signal for subscribing the queue 121. The filtering section 131 refers to the DNA server by using a domain name of the alert receiving server 120. Therefore, the filtering section 131 can obtain IP addresses of all the alert receiving servers selectable as a destination from registered IP addresses associated with domain names of the alert receiving servers 120 for registration.

[Step S43]

The filtering section 131 determines whether or not the alert receiving server 120 is added or changed. The process returns to step S42 when the addition or change is determined to be recognized, while the process proceeds to step S44 when the addition or change is determined not to be recognized.

In order that the filtering section 131 may recognize the addition or change of the alert receiving server 120, for example, the filtering section 131 stores the list of IP addresses that is obtained at the time of referring to the DNS server the last time and that is associated with server names of the alert receiving servers 120 previously set for registration, and compares the list with a list obtained this time.

[Step S44]

The filtering section 131 is in a standby state of waiting for receiving an error message from the alert receiving server 120.

[Step S45]

The filtering section 131 determines whether or not receiving an error message from the alert receiving server 120 within a certain period of time. The process proceeds to step S46 when the filtering section 131 receives an error message, while the process returns to step S43 when the filtering section 131 does not receive an error message.

[Step S46]

The filtering section 131 compares the received error message with a filtering rule previously read.

[Step S47]

The filtering section 131 determines an alert level of the received error message by using the filtering rule. This determination is made, for example, by setting a certain character string included in the error message as a rule and by determining whether or not the character string is included in the error message.

[Step S48]

The filtering section 131 attaches an identifier, or information indicating an alert level and a rule ID to the received error message.

[Step S49]

The filtering section 131 determines whether the received error message is discarded or not. The process returns to step S43 when the received error message is determined to be discarded, while the process proceeds to step S50 when the received error message is determined not to be discarded. For example, the filtering section 131 discards an error message whose alert level is a predetermined level or less. The filtering section 131 may also discard an error message whose contents correspond to a predetermined criterion for discarding. For example, a body of an error message transmitted in the case of not actually being a problem may be previously stored as a criterion for discarding.

[Step S50]

The filtering section 131 transmits the error message to the topic 122 in the alert receiving server 120. At this time, an error message is transmitted to another alert receiving server every time an error message is transmitted in order to avoid concentration of loads in a certain alert receiving server.

According to this process, the error message having the alert level attached is transmitted to the alert receiving server 120. Since an alert whose alert level determined to be lower than the predetermined level is discarded, an error message having a low alert level is not subjected to a subsequent process. This enables reduction of traffic with respect to the whole server monitoring system 100.

When receiving the error massage having the alert level attached, the topic 122 transmits the error message having the alert level attached to all the connected filter servers 130.

5.5 Process of Summarizing 5.5.1 Process of Storing Error Message

FIG. 11 is a flow chart showing a procedure for a process of storing an error message by a summarizing section in the filter server. Hereinafter, the process of storing an error message shown in FIG. 11 will be described according to the step numbers.

[Step S51]

The summarizing section 132 transmits to the topics 122 in all the alert receiving servers 120 a signal for subscribing the topic 122. The summarizing section 132 refers to the DNA server by using a domain name of the alert receiving server 120. Therefore, the summarizing section 132 can recognize IP addresses of all the alert receiving servers 120 selectable as a destination from registered IP addresses associated with domain names of the alert receiving servers 120.

[Step S52]

The summarizing section 132 determines whether or not the alert receiving server 120 is added or changed. The process returns to step S51 when the addition or change is determined to be recognized, while the process proceeds to step S53 when the addition or change is determined not to be recognized.

In order that the summarizing section 132 may recognize the addition or change of the alert receiving server 120, for example, the summarizing section 132 stores the list of IP addresses that is obtained at the time of referring to the DNS server the last time and that is associated with server names of the alert receiving servers 120 previously set for registration, and compares the list with a list obtained this time.

[Step S53]

The summarizing section 132 is in a standby state of waiting for receiving an error message from the alert receiving server 120.

[Step S54]

The summarizing section 132 determines whether or not receiving an error message from the alert receiving server 120. The process proceeds to step S55 when the summarizing section 132 receives an error message, while the process returns to step S52 when the summarizing section 132 does not receive an error message.

[Step S55]

The summarizing section 132 obtains a rule ID attached to the received error message.

[Step S56]

The summarizing section 132 determines whether or not a reception history corresponding to the obtained rule ID is stored in the message storing section 135. The process proceeds to step S57 when the reception history is stored, while the process proceeds to step S58 when the reception history is not stored.

[Step S57]

The summarizing section 132 adds the error message having a new address to an error message having the common rule ID among error messages stored in the message storing section 135. At this time, the last update date and time is stored. A new address here is an address of the monitoring target server 110 having transmitted the error message.

[Step S58]

The summarizing section 132 stores the obtained error message in the message storing section 135, while at this time storing the last update date and time.

[Step S59]

The summarizing section 132 transmits the error message to the predetermined queue 123. The error message is transmitted to the mail transmitting section 133 via the queue 123 to be transmitted, for example, as e-mail to a person in charge.

According to such a process, second and subsequent error messages of the same type are stored and a first error message is immediately transmitted to the person in charge by e-mail.

The summarizing section 132 may directly transmit e-mail to the person in charge instead of transmitting an error message to the queue 123.

5.2.2 Processes of Summarizing and Transmitting Error Messages

FIG. 12 is a flow chart showing a procedure for processes of summarizing and transmitting error messages by the summarizing section in the filter server. Hereinafter, the process of transmitting an error message shown in FIG. 12 will be described according to step numbers.

[Step S61]

The summarizing section 132 determines whether or not an error message is stored in the message storing section 135. The process proceeds to step S62 when an error message is stored, while the process proceeds to step S63 when an error message is not stored.

[Step S62]

The summarizing section 132 obtains information of the stored error messages one by one. When error messages of the same type are summarized, the summarizing section 132 obtains them all together as one group.

[Step S63]

The summarizing section 132 waits for a certain period of time.

[Step S64]

The summarizing section 132 determines whether or not a certain period of time or more has elapsed since the last update date and time of the stored error message. The process proceeds to step S65 when a certain period of time or more has elapsed, while the process returns to step S61 when a certain period of time or more does not have elapsed.

[Step S65]

The summarizing section 132 transmits one error message created in step S62 to the predetermined queue 123.

[Step S66]

The summarizing section 132 deletes from the message storing section 135 an error message being a base of the transmitted error message (an error message transmitted from the monitoring target server 110 and not being summarized).

The processes of storing and transmitting an error message described in FIGS. 11 and 12 are regarded as a process of summarizing.

5.6 Process of Transmitting Mail

FIG. 13 is a flow chart showing a procedure for a process of transmitting mail by a mail transmitting section. Hereinafter, the process of transmitting mail shown in FIG. 13 will be described according to the step numbers.

[Step S71]

The mail transmitting section 133 reads a destination rule stored in the destination-rule storing section 136.

[Step S72]

The mail transmitting section 133 is connected to all the alert receiving servers 120 to transmit to the queue 123 a signal for subscribing the queue 123. In order to recognize how many alert receiving servers 120 are connected at present, the mail transmitting section 133 refers to the DSN server for an IP address associated with a server name of the alert receiving server 120 previously set for registration.

[Step S73]

The mail transmitting section 133 determines whether or not the alert receiving server 120 is added or changed. The process returns to step S72 when the addition or change is determined to be recognized, while the process proceeds to step S74 when the addition or change is deter mined not to be recognized.

In order that the mail transmitting section 133 may recognize the addition or change of the alert receiving server 120, for example, the mail transmitting section 133 stores the list of IP addresses that is obtained at the time of referring to the DNS server the last time and that is associated with server names of the alert receiving servers 120 previously set for registration, and compares the list with a list obtained this time.

[Step S74]

The mail transmitting section 133 is in a standby state of waiting for receiving an error message from the alert receiving server 120.

[Step S75]

The mail transmitting section 133 determines whether or not receiving an error message from the queue 123 within a certain period of time. The process proceeds to step S76 when the mail transmitting section 133 receives an error message, while the process returns to step S73 when the mail transmitting section 133 does not receive an error message.

[Step S76]

The mail transmitting section 133 compares the received error message with a destination rule previously read to determine a destination of mail of the error message.

[Step S77]

The mail transmitting section 133 creates a body of mail from contents of the error message.

[Step S78]

The mail transmitting section 133 transmits the created mail.

According to the process described above, an error message transmitted from the monitoring program installed in the monitoring target server 110 is transmitted and received between the alert receiving servers 120 and the filter servers 130 for transmitting mail, which can avoid concentration of loads in a certain alert receiving server 120 or a filter server 130. Also, when an alert receiving server 120 or a filter server 130 is added, a server having the same configuration as the alert receiving server 120 or filter server 130 having been operating is prepared and registered in DSN server. This allows a new server to operate as a part of the server monitoring system 100 without changing the other settings, thereby enabling easy extension as well as less workload and excellent maintainability.

6. Operation and Effect

According to the embodiment, the server monitoring system 100 includes the alert receiving server 120 connected to the monitoring target server 110 and two or more filter servers 130 connected to the alert receiving server 120. Then, the filtering section 131, the summarizing section 132 and the mail transmitting section provided in the filter server 130 process a received error message. More specifically, the topic 122 provided in the alert receiving server 120 first transmits an error message to all the filter severs 130. Next, the topic 124 provided in the alert receiving server 120 transmits information of one filter server 130, received from the summarizing section 132 provided in the one filter server 130, to the other filter server 130 or the other filter servers 130. The summarizing section 132 in the filter server 130 then determines itself to be a representative or not by comparing predetermined information (for example, an IP address) set in its own apparatus with predetermined information set in the other filter server 130 or the other filter servers 130. The mail transmitting section 133 in the filter server 130 having determined as a representative then transmits the error message to a predetermined address.

Accordingly, while the error message is transmitted to all the filter servers 130, only the filter server 130 having determined as a representative transmits the error message to the predetermined address. Here, the filter server 130 to be a representative is determined depending on predetermined information transmitted and received each other via the topic 124 in the alert receiving server 120 (for example, an IP address of each filter server 130). According to such a configuration, a new representative is automatically determined, for example, in the case where the filter server 130 having determined as a representative enters a state of not being able to operate due to a failure or the like, or in the case where a filter server 130 is newly added. Therefore, a process for the error message is performed without changing settings in each server every time a new server is added, thereby being able to provide a message processing system with excellent maintainability and availability.

Although the mail transmitting section 133 transmits an error message by transmitting mail to a person in charge in the embodiment, an information function such as an instant messenger may be used for transmitting an error message to the person in charge of failure.

Additionally, although the description has been made about the case where the filtering-rule storing section 134, the message storing section 135 and the destination-rule storing section 136 are provided in the filter server 130 in the embodiment, the filtering-rule storing section 134, the message storing section 135 and the destination-rule storing section 136 may be provided outside the filter server 130.

7. Modification

FIG. 14 is a schematic diagram showing an error message flow when the error message after the process of filtering is received by two topics.

As shown in FIG. 14, a topic 125 is newly provided. In an example of FIG. 14, the topic 125 is provided, for example, in the alert receiving server 120.

When receiving an error message transmitted from the monitoring target server 110 via the queue 121, the filtering section 131 transmits an error message determined to have a high degree of importance to the topic 122 and transmits an error message determined not to have a high degree of importance to the topic 125 according to a result of the process of filtering.

When receiving the error message determined not to have a high degree of importance, the topic 125 transmits the error message to a report section 137. The report section 137 stores the error message for a certain period of time (for example, 1 hour) to transmit the error message to a subscriber 180 such as a person in charge of failure. If e-mail transmitted from the mail transmitting section 133 to the subscriber 180 is transmitted to a cellular phone, while e-mail transmitted from the report section 137 is transmitted to a computer, e-mail can be used properly depending on a situation. That is, it can be determined that a failure described in the e-mail transmitted to a cellular phone of the person in charge is important and requires an immediate remedy and a failure described in the e-mail transmitted to a computer has a low degree of importance but can be recognized.

When the report section 137 is provided in the filter server 130 and a plurality of filter servers 130 are provided, the topic 125 may transmit a message to all the report sections 137 and only the topic 125 having been determined as a representative may transmit e-mail to the subscriber 180, similarly to the topic 122.

REFERENCE SIGNS LIST

100 server monitoring system
110 monitoring target server
120, 120A, 120B alert receiving server
121, 121A, 121B, 123, 123A, 123B queue
122, 122A, 122B, 124, 124A, 124B topic
130, 130A, 130B, 130C filter server
131, 131A, 131B, 131C filtering section
132, 132A, 132B, 132C summarizing section
133, 133A, 133B, 133C mail transmitting section The present disclosure has been described with reference to example embodiments, however persons skilled in the art will recognize that changes may be made in form and detail without departing from the spirit and scope of the disclosed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation may be reversed or otherwise varied, the operation or other elements of the system may be varied, the nature or number of the operation or other coordination provided between the elements may be varied. It should be noted that the elements and/or assemblies of the system may be constructed from any of a wide variety of possibilities. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter.

What is claimed is:

1. A message processing method of monitoring server state in target servers, the method comprising the steps of:
    receiving, by a message delivering apparatus from a publisher server, a first message indicating that the publisher server enters a predetermined state, wherein the message delivering apparatus is connected to the publisher server;
    transmitting, by the message delivering apparatus, the received first message to a plurality of message processing apparatuses, wherein the plurality of message processing apparatuses are connected to the message delivering apparatus;
    filtering, by each message processing apparatus of the plurality of message processing apparatuses, the first message received from the message delivering apparatus using a filtering rule obtained from a storage device;
    summarizing, by each message processing apparatus of the plurality of message processing apparatuses, the filtered first message;
    receiving, by the message delivering apparatus, from each message processing apparatus of the plurality of message processing apparatuses, respective predetermined information of the each message processing apparatus;
    transmitting, by the message delivering apparatus, the respective predetermined information of the each message processing apparatus to other message processing apparatuses of the plurality of message processing apparatuses except for to the message processing apparatus from which the respective predetermined information is received, such that each of the plurality of message processing apparatuses has the respective predetermined information of other message processing apparatuses of the plurality of message processing apparatuses;
    after each message processing apparatus of the plurality of message processing apparatuses filters and summarizes the first message, determining, by each message processing apparatus of the plurality of message processing apparatuses, whether or not the each message processing apparatus is a representative of all the plurality of message processing apparatuses by comparing the respective predetermined information of the each message processing apparatus with the respective predetermined information of at least one other message processing apparatus of the plurality of message processing apparatuses; and
    transmitting, by a first message processing apparatus of the plurality of message processing apparatuses, which is determined as the representative of all the plurality of message processing apparatuses, a notice based on content of the first message filtered and summarized by the first message processing apparatus.

2. The message processing method according to claim 1, wherein the filtering rule is among a plurality of filtering rules stored in the storage device, the filtering rule defining an alert level and a rule identifier in association with a corresponding string.

3. A message processing system of monitoring server state in target servers, comprising:
    a message delivering apparatus connected to a publisher server; and
    a plurality of message processing apparatuses connected to the message delivering apparatus,
    wherein the message delivering apparatus receives, from the publisher server, a first message indicating that the publisher server enters a predetermined state and transmits the received first message to the plurality of message processing apparatuses,
    wherein each message processing apparatus of the plurality of message processing apparatuses (i) filters the first message transmitted from the publisher server and received via the message delivering apparatus using a filtering rule obtained from a storage device, and (ii) summarizes the filtered first message,
    wherein the message delivering apparatus receives, from each message processing apparatus of the plurality of message processing apparatuses, respective predetermined information of the each message processing apparatus, and transmits the respective predetermined information of the each message processing apparatus to other message processing apparatuses of the plurality of message processing apparatuses except for to the message processing apparatus from which the respective predetermined information is received, such that each of the plurality of message processing apparatuses has the respective predetermined information of other message processing apparatuses of the plurality of message processing apparatuses,
    wherein, after each message processing apparatus of the plurality of message processing apparatuses filters and summarizes the first message, each message processing apparatus of the plurality of message processing apparatuses determines whether or not the each message processing apparatus is a representative of all the plurality of message processing apparatuses by comparing the respective predetermined information of the each message processing apparatus with the respective predetermined information of at least one other message processing apparatus of the plurality of message processing apparatuses, wherein a first message processing apparatus among the plurality of message processing apparatuses is determined as the representative of all the plurality of message processing apparatuses, and wherein the first message processing apparatus determined as the representative of all the plurality of message processing apparatuses transmits a notice based on content of the first message filtered and summarized by the first message processing apparatus.

4. The message processing system according to claim 3, wherein each message processing apparatus summarizes the filtered first message by summarizing the filtered first message and at least another message of the same type as the first message, wherein the at least another message is among messages received via the message delivering apparatus.

5. The message processing system according to claim 3, wherein each message processing apparatus filters the first message based on a degree of importance of the first message received via the message delivering apparatus.

6. The message processing system according to claim 3, wherein each message processing apparatus summarizes messages of the same type among messages received via the message delivering apparatus based on a result of filtering processed by the each message processing apparatus.

7. The message processing system according to claim 3, wherein the message delivering apparatus selects one of the message processing apparatuses and transmits a second message received from the publisher server to the selected message processing apparatus, and wherein the selected message processing apparatus performs a process of filtering to the second message received via the message delivering apparatus and transmits the second message after the process of filtering to the message delivering apparatus.

8. The message processing system according to claim 3, wherein the publisher server is a target server for monitoring a failure and the first message is an error message including the content of a failure having occurred in the server.

9. The message processing system according to claim 3, wherein the predetermined information of the each message processing apparatus is an IP address of the each message processing apparatus, and wherein the each message processing apparatus compares an IP address of the at least one other message processing apparatus of the plurality of message processing apparatuses with an IP address of the each message processing apparatus and determines the each message processing apparatus as a representative when a predetermined value included in the IP address of the each message processing apparatus corresponds to a predetermined condition.

10. The message processing system according to claim 3, wherein the first message processing apparatus that is determined as the representative of all the plurality of message processing apparatuses informs a person in charge of failure about the filtered and summarized first message by using e-mail.

11. The message processing system according to claim 3, wherein the filtering rule is among a plurality of filtering rules stored in the storage device, the filtering rule defining an alert level and a rule identifier in association with a corresponding string.

* * * * *